(12) United States Patent
Obata et al.

(10) Patent No.: US 9,853,316 B2
(45) Date of Patent: Dec. 26, 2017

(54) FUEL CELL SYSTEM

(71) Applicant: NISSAN MOTOR CO., LTD., Kanagawa (JP)

(72) Inventors: Takeaki Obata, Yokohama (JP); Yoshitomo Asai, Yokohama (JP); Hayato Chikugo, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 511 days.

(21) Appl. No.: 14/385,048

(22) PCT Filed: Mar. 13, 2013

(86) PCT No.: PCT/JP2013/057041
§ 371 (c)(1),
(2) Date: Sep. 12, 2014

(87) PCT Pub. No.: WO2013/137334
PCT Pub. Date: Sep. 19, 2013

(65) Prior Publication Data
US 2015/0056533 A1    Feb. 26, 2015

(30) Foreign Application Priority Data

Mar. 15, 2012  (JP) .................................. 2012-059263

(51) Int. Cl.
*H01M 8/04*      (2016.01)
*H01M 8/04992*   (2016.01)
(Continued)

(52) U.S. Cl.
CPC ... *H01M 8/04992* (2013.01); *H01M 8/04089* (2013.01); *H01M 8/04104* (2013.01);
(Continued)

(58) Field of Classification Search
CPC ......... H01M 8/04992; H01M 8/04089; H01M 8/04104; H01M 8/04388; H01M 8/04753;
(Continued)

(56) References Cited

U.S. PATENT DOCUMENTS

2012/0107711 A1*  5/2012  Tomita .............. H01M 8/04388
429/446

FOREIGN PATENT DOCUMENTS

EP    2453507 A1     5/2012
JP    2005243476 A   9/2005

OTHER PUBLICATIONS

Communication and the extended European search report, dated Feb. 11, 2015, from the corresponding European Patent Application No. 13760752.9.

* cited by examiner

*Primary Examiner* — Jane Rhee
(74) *Attorney, Agent, or Firm* — Young Basile Hanlon & MacFarlane, P.C.

(57) ABSTRACT

A fuel cell system includes a target pressure setting unit configured to periodically and repeatedly set a target upper limit pressure and a target lower limit pressure as a target pressure of anode gas. An upper limit pressure setting unit is configured to set the smaller one of an upper limit value based on durability performance and an upper limit value based on output performance as an upper limit pressure of the anode gas. The target pressure setting unit sets a value smaller than the upper limit value as the target upper limit pressure when the upper limit value based on the durability performance of the fuel cell is selected as the upper limit pressure of the anode gas, and sets a pressure higher than the upper limit value as the target upper limit pressure when the upper limit value based on the output performance is selected.

14 Claims, 19 Drawing Sheets

(51) Int. Cl.
- *H01M 8/04089* (2016.01)
- *H01M 8/0438* (2016.01)
- *H01M 8/04746* (2016.01)
- *H01M 8/1039* (2016.01)
- *H01M 8/1018* (2016.01)

(52) U.S. Cl.
CPC ... *H01M 8/04388* (2013.01); *H01M 8/04753* (2013.01); *H01M 8/04783* (2013.01); *H01M 8/1039* (2013.01); H01M 2008/1095 (2013.01); H01M 2250/20 (2013.01); *Y02T 90/32* (2013.01)

(58) Field of Classification Search
CPC ........... H01M 8/1039; H01M 8/04783; H01M 2008/1095; H01M 2250/20
See application file for complete search history.

FUEL CELL SYSTEM

CROSS REFERENCE TO RELATED APPLICATION

The present application claims priority to Japanese Patent Application No. 2012-059263 filed with the Japan Patent Office on Mar. 15, 2012, all the contents of which are hereby incorporated by reference.

TECHNICAL FIELD

This invention relates to a fuel cell system.

BACKGROUND

JP2005-243476A discloses, as a conventional fuel cell system, a fuel cell system of an anode gas non-circulation type in which unused anode gas discharged to an anode gas discharge passage is not returned to an anode gas supply passage. This conventional fuel cell system suppresses a reduction in output performance of fuel cells by performing a pulsating operation of increasing and reducing a pressure of the anode gas and supplying the anode gas at a flow rate higher than a required flow rate to the fuel cells to discharge impurities retained in the fuel cells to the outside of the fuel cells at the time of increasing the pressure.

SUMMARY

At present, the present inventors are studying a pulsation control of anode gas by repeatedly setting a high pressure and a low pressure as a target pressure and executing a feedback control of an anode gas pressure by a pressure regulating valve to achieve the target pressure.

On the other hand, two upper limit pressures are set for this pulsation. One is the upper limit pressure for pulsation for ensuring stack performance requirements, for example, to push water in a stack into a buffer tank or the like. The other is the upper limit pressure for pulsation for ensuring durability in consideration of mechanical strength of electrolyte membranes and the like.

Since there is a possibility of shortening a product life if the upper limit pressure taking into account durability is exceeded, it is, for example, considered to constantly give a target pressure lower than the upper limit pressure as a target value of the feedback control so as to never exceed a target upper limit pressure.

However, if the target pressure lower than the upper limit pressure is constantly set, a sufficient pulsation amplitude cannot be given and water may be possibly insufficiently discharged since the target pressure is set low when the upper limit pressure for pulsation for ensuring performance requirements is set.

The present invention was developed, focusing on such a problem, and aims to provide an optimal target pressure feedback control according to a set upper limit pressure for pulsation.

According to a certain aspect of the present invention, a fuel cell system is provided which includes a control valve configured to control a pressure of anode gas to be supplied to a fuel cell, a pressure detection unit configured to detect the pressure of the anode gas to be supplied to the fuel cell, a target pressure setting unit configured to periodically and repeatedly set a target upper limit pressure and a target lower limit pressure as a target pressure of the anode gas, a pressure control unit configured to control the pressure of the anode gas by feedback-controlling the control valve based on the pressure of the anode gas detected by the pressure detection unit and the target pressure, and an upper limit pressure setting unit configured to set the smaller one of an upper limit value of the anode gas set based on durability performance of the fuel cell and an upper limit value of the anode gas set based on output performance of the fuel cell as an upper limit pressure of the anode gas. The target pressure setting unit sets a value smaller than the upper limit value as the target upper limit pressure when the upper limit value of the anode gas set based on the durability performance of the fuel cell is selected as the upper limit pressure of the anode gas and sets a pressure higher than the upper limit value as the target upper limit pressure when the upper limit value of the anode gas set based on the output performance of the fuel cell is selected.

Embodiments and advantages of the present invention are described in detail below with reference to the accompanying drawings.

DESCRIPTION OF EMBODIMENTS

First Embodiment

In a fuel cell, an electrolyte membrane is sandwiched between an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both the anode electrode and the cathode electrode are as follows.

Anode electrode: $2H_2 \rightarrow 4H^+ + 4e^-$ (1)

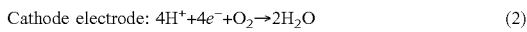

Cathode electrode: $4H^+ + 4e^- + O_2 \rightarrow 2H_2O$ (2)

The fuel cell generates an electromotive force of about 1 volt by these electrode reactions (1), (2).

Figure 1A:
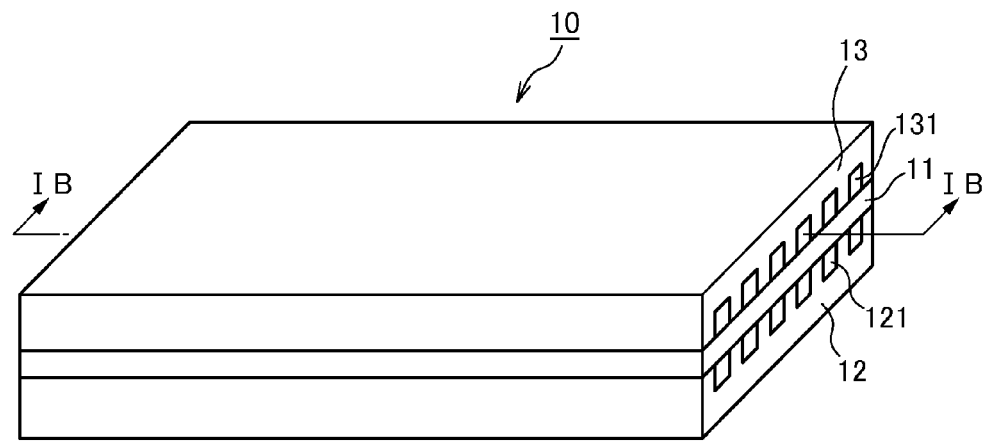
FIG. 1A is a schematic perspective view of a fuel cell according to a first embodiment of the present invention.
Figure 1B:
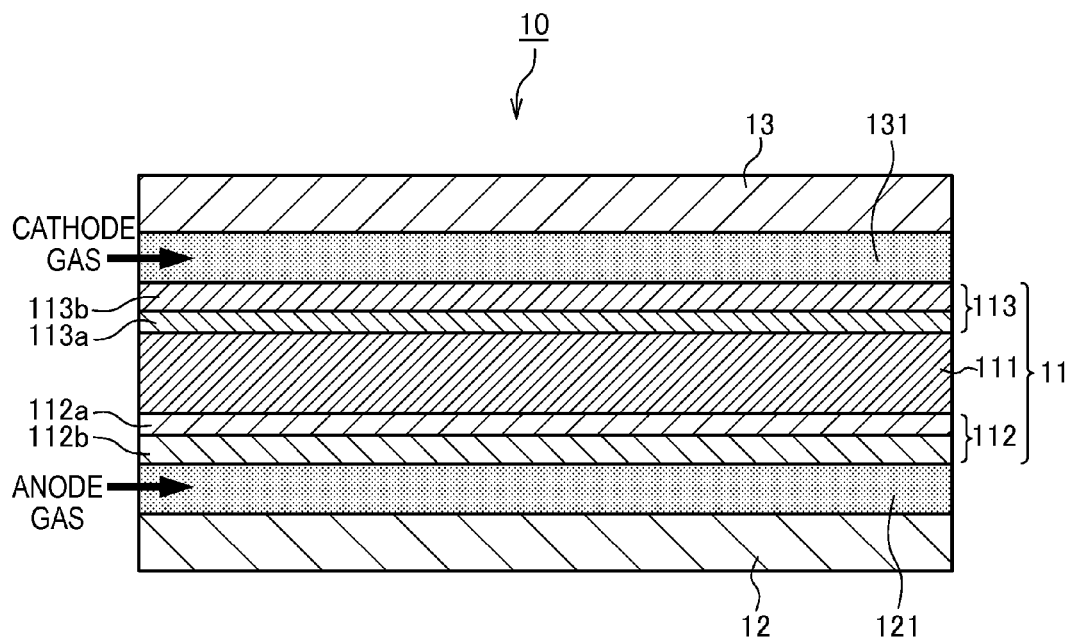
FIG. 1B is a sectional view along IB-IB of the fuel cell 10 of FIG. 1A.

FIGS. 1A and 1B are views showing the configuration of a fuel cell 10 according to a first embodiment of the present invention. FIG. 1A is a schematic perspective view of the fuel cell 10. FIG. 1B is a sectional view along IB-IB of the fuel cell 10 of FIG. 1A.

The fuel cell 10 is configured by arranging an anode separator 12 and a cathode separator 13 on both sides of a membrane electrode assembly (hereinafter, referred to as an "MEA") 11.

The MEA 11 includes an electrolyte membrane 111, an anode electrode 112 and a cathode electrode 113. The MEA 11 includes the anode electrode 112 on one surface of the electrolyte membrane 111 and the cathode electrode 113 on the other surface.

The electrolyte membrane 111 is a proton conductive ion exchange membrane formed of fluororesin. The electrolyte membrane 111 exhibits good electrical conductivity in a wet state.

The anode electrode 112 includes a catalyst layer 112a and a gas diffusion layer 112b. The catalyst layer 112a is in contact with the electrolyte membrane 111. The catalyst layer 112a is formed of platinum or carbon black particles carrying platinum or the like. The gas diffusion layer 112b is provided on the outer side (side opposite to the electrolyte membrane 111) of the catalyst layer 112a and in contact with the anode separator 12. The gas diffusion layer 112b is formed of a member having sufficient gas diffusion property and electrical conductivity, e.g. formed of carbon cloth woven of a thread made of carbon fiber.

Similarly to the anode electrode 112, the cathode electrode 113 includes a catalyst layer 113a and a gas diffusion layer 113b.

The anode separator 12 is in contact with the gas diffusion layer 112b. The anode separator 12 includes, on a side in contact with the gas diffusion layer 112b, a plurality of groove-like anode gas flow passages 121 for supplying anode gas to the anode electrode 112.

The cathode separator 13 is in contact with the gas diffusion layer 113b. The cathode separator 13 includes, on a side in contact with the gas diffusion layer 113b, a plurality of groove-like cathode gas flow passages 131 for supplying cathode gas to the cathode electrode 113.

The anode gas flowing in the anode gas flow passages 121 and the cathode gas flowing in the cathode gas flow passages 131 flow in the same direction in parallel with each other. These gases may flow in opposite directions in parallel with each other.

In the case of using such a fuel cell 10 as a power source for an automotive vehicle, a fuel cell stack in which several hundreds of fuel cells 10 are laminated is used since required power is large. Power for driving the vehicle is taken out by configuring a fuel cell system for supplying anode gas and cathode gas to the fuel cell stack.

Figure 2:
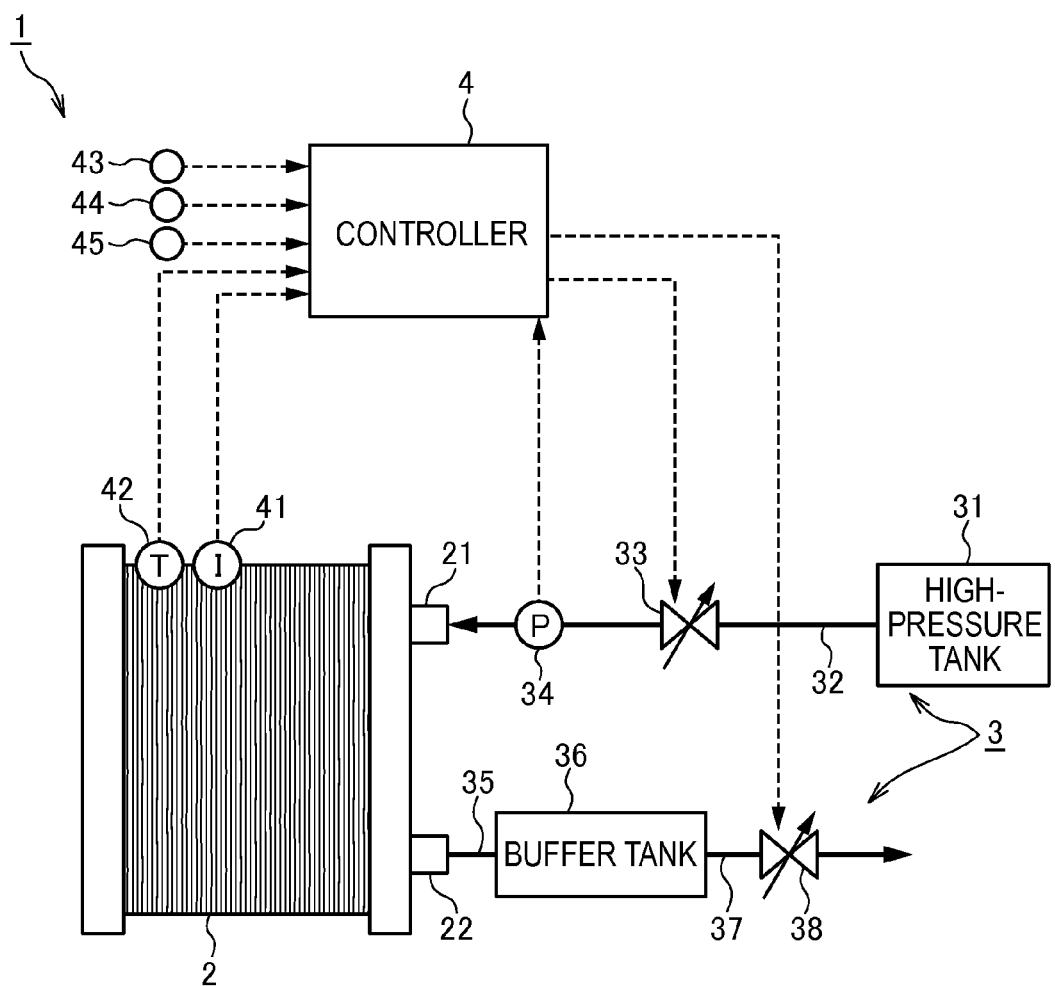
FIG. 2 is a schematic configuration diagram of a fuel cell system of an anode gas non-circulation type according to the first embodiment of the present invention.

FIG. 2 is a schematic configuration diagram of a fuel cell system 1 of an anode gas non-circulation type according to the first embodiment of the present invention.

The fuel cell system 1 includes a fuel cell stack 2, an anode gas supplying device 3 and a controller 4.

The fuel cell stack 2 is formed by laminating a plurality of fuel cells 10 and generates power necessary to drive a vehicle (e.g. power necessary to drive a motor) upon receiving the supply of the anode gas and the cathode gas.

A cathode gas supplying/discharging device for supplying/discharging the cathode gas to the fuel cell stack 2 and a cooling device for cooling the fuel cell stack 2 are not shown to facilitate the understanding since they are not principal parts of the present invention. In the present embodiment, air is used as the cathode gas.

The anode gas supplying device 3 includes a high-pressure tank 31, an anode gas supply passage 32, a pressure regulating valve 33, a pressure sensor 34, an anode gas discharge passage 35, a buffer tank 36, a purge passage 37 and a purge valve 38.

The high-pressure tank 31 stores the anode gas to be supplied to the fuel cell stack 2 in a high pressure state.

The anode gas supply passage 32 is a passage for supplying the anode gas discharged from the high-pressure tank 31 to the fuel cell stack 2, one end is connected to the high-pressure tank 31 and the other end is connected to an anode gas inlet hole 21 of the fuel cell stack 2.

The pressure regulating valve 33 is provided in the anode gas supply passage 32. The pressure regulating valve 33 supplies the anode gas discharged from the high-pressure tank 31 to the fuel cell stack 2 while adjusting the anode gas to a desired pressure. The pressure regulating valve 33 is an electromagnetic valve capable of adjusting an opening continuously or stepwise, and the opening thereof is controlled by the controller 4.

The pressure sensor 34 is provided downstream of the pressure regulating valve 33 in the anode gas supply passage 32. The pressure sensor 34 detects a pressure in a part of the anode gas supply passage 32 downstream of the pressure regulating valve 33. In the present embodiment, the pressure detected by this pressure sensor 34 is used as a pressure of the entire anode system (hereinafter, referred to as an "anode pressure") including each anode gas flow passage 121 in the fuel cell stack and the buffer tank 36.

One end of the anode gas discharge passage 35 is connected to an anode gas outlet hole 22 of the fuel cell stack 2 and the other end is connected to an upper part of the buffer tank 36. Mixture gas of excess anode gas which is not used in an electrode reaction and inert gas such as nitrogen and water vapor permeating from the cathode side to the anode gas flow passages 121 (hereinafter, referred to as "anode off-gas") is discharged to the anode gas discharge passage 35.

The buffer tank 36 temporarily stores the anode off-gas having flowed through the anode gas discharge passage 35.

A part of water vapor in the anode off-gas is condensed into liquid water and separated from the anode off-gas in the buffer tank 36.

One end of the purge passage 37 is connected to a lower part of the buffer tank 36. The other end of the purge passage 37 is an opening end. The anode off-gas and liquid water accumulated in the buffer tank 36 are discharged to outside air from the opening end through the purge passage 37.

The purge valve 38 is provided in the purge passage 37. The purge valve 38 is an electromagnetic valve capable of adjusting an opening continuously or stepwise, and the opening thereof is controlled by the controller 4. By adjusting the opening of the purge valve 38, the amount of the anode off-gas discharged from the buffer tank 36 to the outside air via the purge passage 37 is adjusted, thereby adjusting an anode gas concentration in the anode system to a predetermined concentration. If a set value of the predetermined concentration is too low, the anode gas used in the electrode reaction is insufficient, wherefore power generation efficiency decreases. On the other hand, if the set value of the predetermined concentration is too high, the amount of the anode gas discharged to the outside air via the purge passage 37 together with the inert gas in the anode off-gas increases, wherefore fuel economy is deteriorated. Thus, the predetermined concentration is set at a suitable value in consideration of power generation efficiency and fuel economy. If an operating state of the fuel cell system 1 is the same, a concentration of the inert gas in the buffer tank 36 decreases and an anode gas concentration increases as the opening of the purge valve 38 is increased.

The controller 4 is configured by a microcomputer including a central processing unit (CPU), a read only memory (ROM), a random access memory (RAM) and an input/output interface (I/O interface).

To the controller 4 are input signals from various sensors for detecting the operating state of the fuel cell system 1 such as a current sensor 41 for detecting an output current of the fuel cell stack 2, a water temperature sensor 42 for detecting the temperature of cooling water for cooling the fuel cell stack 2, a pressure sensor 43 for detecting a pressure of the cathode gas to be supplied to the fuel cell stack (hereinafter, referred to as a "cathode pressure"), an accelerator stroke sensor 44 for detecting a depressed amount of an accelerator pedal (hereinafter, referred to as "accelerator operation amount"), an SOC sensor 45 for detecting a battery charging rate and the like in addition to the aforementioned pressure sensor 34.

Further, the controller 4 performs a pulsating operation of periodically increasing and reducing the anode pressure by periodically opening and closing the pressure regulating valve 33 based on input signals from various sensors and adjusts a flow rate of the anode off-gas discharged from the buffer tank 36 by adjusting the opening of the purge valve 38, thereby keeping the anode gas concentration in the anode system at the predetermined concentration.

In the pulsating operation, an upper limit pressure and a lower limit pressure are repeatedly set as a target pressure of the anode pressure and a feedback control by the pressure regulating valve is executed to achieve the set pressure, whereby the anode pressure is pulsated by being periodically increased and reduced between the upper limit pressure and the lower limit pressure.

By performing the pulsating operation, the liquid water in the anode gas flow passages 121 can be periodically discharged to the outside of the anode gas flow passages 121 when the anode pressure is increased. Thus, it is possible to improve drainage performance and, consequently, output performance of the fuel cell stack.

Figure 3:
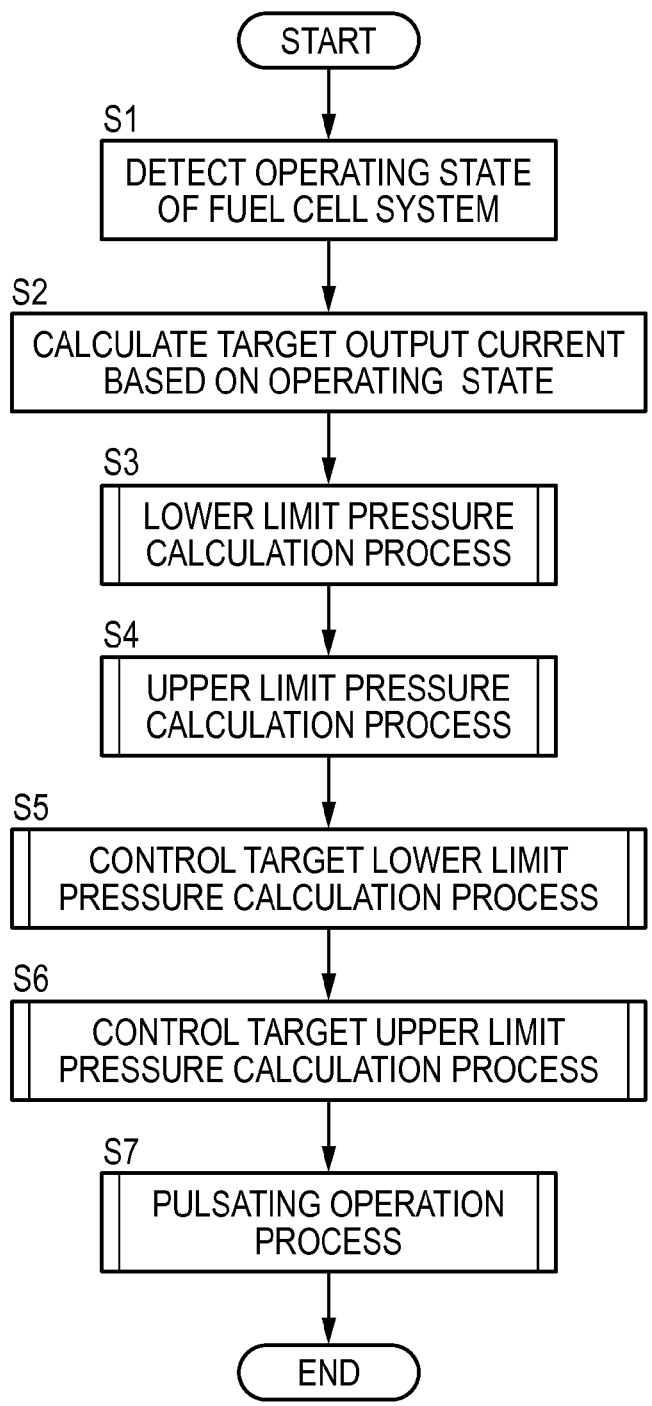
FIG. 3 is a flow chart showing a pulsating operation control according to the first embodiment of the present invention.

FIG. 3 is a flow chart showing a pulsating operation control according to the present embodiment.

In Step S1, the controller 4 reads detection signals of the various sensors and detects the operating state of the fuel cell system 1.

In Step S2, the controller 4 calculates a target output current of the fuel cell stack based on the operating state of the fuel cell system 1.

In Step S3, the controller 4 performs a lower limit pressure calculation process for anode pressure. The lower limit pressure calculation process is described in detail later with reference to FIG. 4.

In Step S4, the controller 4 performs an upper limit pressure calculation process for anode pressure. The upper limit pressure calculation process is described in detail later with reference to FIG. 6.

In Step S5, the controller 4 performs a calculation process for a lower limit pressure targeted in controlling the anode pressure to the lower limit pressure (hereinafter, referred to as a "control target lower limit pressure"). The control target lower limit pressure calculation process is described in detail later with reference to FIG. 8.

In Step S6, the controller 4 performs a calculation process for an upper limit pressure targeted in controlling the anode pressure to the upper limit pressure (hereinafter, referred to as a "control target upper limit pressure"). The control target upper limit pressure calculation process is described in detail later with reference to FIG. 9.

In Step S7, the controller 4 performs the pulsating operation process. The pulsating operation process is described in detail later with reference to FIG. 10.

Figure 4:
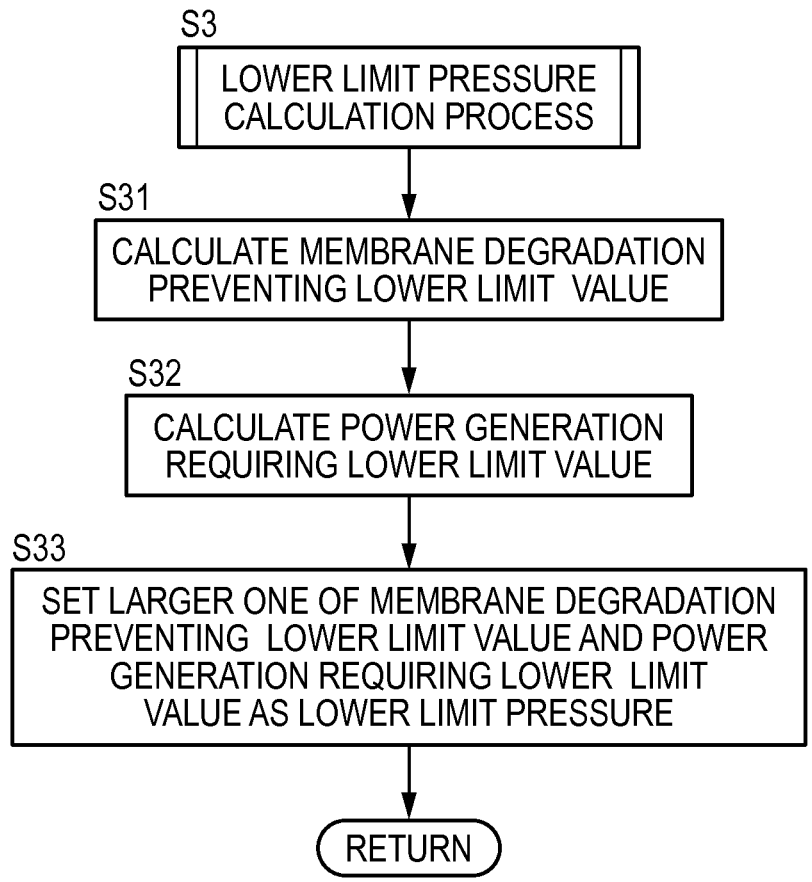
FIG. 4 is a flow chart showing a lower limit pressure calculation process for anode pressure.

FIG. 4 is a flow chart showing the lower limit pressure calculation process for anode pressure.

In Step S31, the controller 4 calculates a membrane degradation preventing lower limit value by subtracting a predetermined value γ from the cathode pressure. The membrane degradation preventing lower limit value is a lower limit value of the anode pressure set in terms of ensuring durability of the electrolyte membranes 111 and a lower limit value of the cathode pressure necessary to prevent the degradation of the electrolyte membranes 111 due to an excessive pressure difference between the cathode pressure (pressure in the cathode gas flow passages 131) and the anode pressure (pressure in the anode gas flow passages 121).

Figure 5:
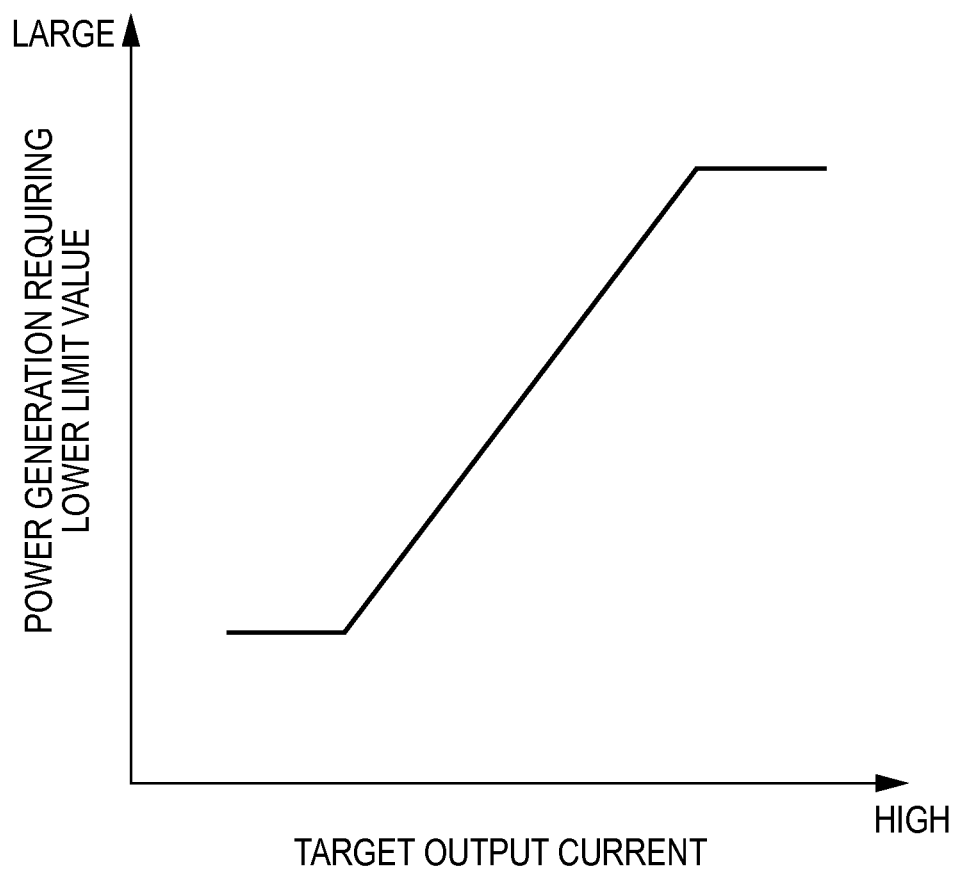
FIG. 5 is a table for calculating a power generation requiring lower limit value based on a target output current.

In Step S32, the controller 4 refers to a table of FIG. 5 and calculates a lower limit value of the anode pressure minimum necessary to output the target output current (hereinafter, referred to as a "power generation requiring lower limit value") based on the target output current. That is, the power generation requiring lower limit value is a lower limit value of the anode pressure set in terms of ensuring output performance of the fuel cell stack 2.

In Step S33, the controller 4 sets the larger one of the membrane degradation preventing lower limit value and the power generation requiring lower limit value as the lower limit pressure of the anode pressure. It should be noted that the membrane degradation preventing lower limit value is set as the lower limit pressure of the anode pressure if the membrane degradation preventing lower limit value and the power generation requiring lower limit value are equal.

Figure 6:
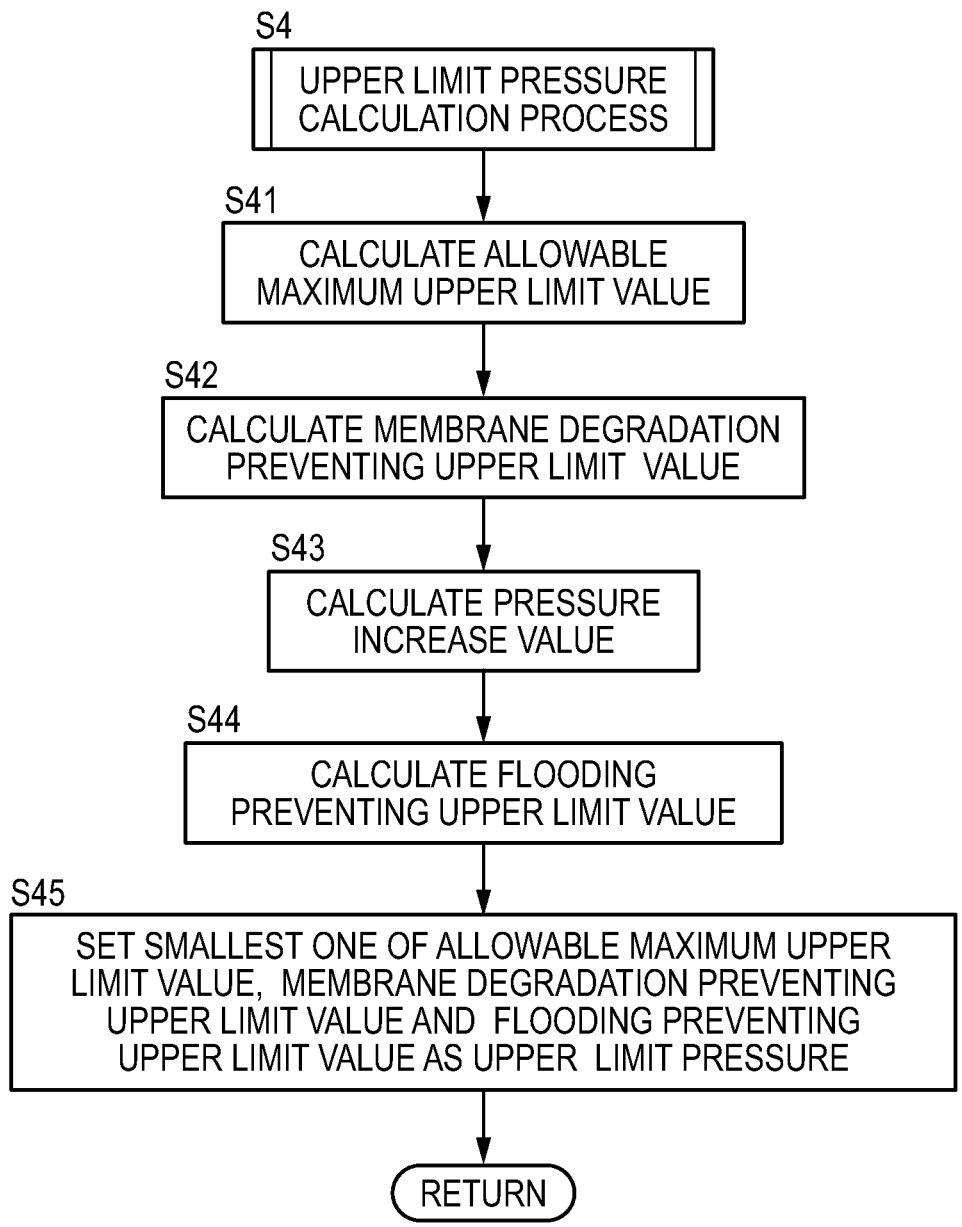
FIG. 6 is a flow chart showing an upper limit pressure calculation process for anode pressure.

FIG. 6 is a flow chart showing the upper limit pressure calculation process for anode pressure.

In Step S41, the controller 4 sets an allowable maximum upper limit value of the anode pressure. The allowable maximum upper limit value is an upper limit value of the anode pressure set in terms of ensuring durability of the electrolyte membranes 111 and an upper limit value of the anode pressure necessary to prevent degradation of the electrolyte membranes 111 due to an excessive anode pressure. The allowable maximum upper limit value is determined according to the specifications of the fuel cell stack 2 and a predetermined value determined by an experiment or the like in advance. If the fuel cell system 1 is operated in a state where the anode pressure is higher than the allowable maximum upper limit value, the electrolyte membranes 111 may be degraded.

In Step S42, the controller 4 calculates a membrane degradation preventing upper limit value by adding the predetermined value γ to the cathode pressure. The membrane degradation preventing upper limit value is an upper limit value of the anode pressure set in terms of ensuring durability of the electrolyte membranes 111 and an upper limit value of the anode pressure necessary to prevent degradation of the electrolyte membranes 111 due to an excessive pressure difference between the cathode pressure and the anode pressure.

Figure 7:
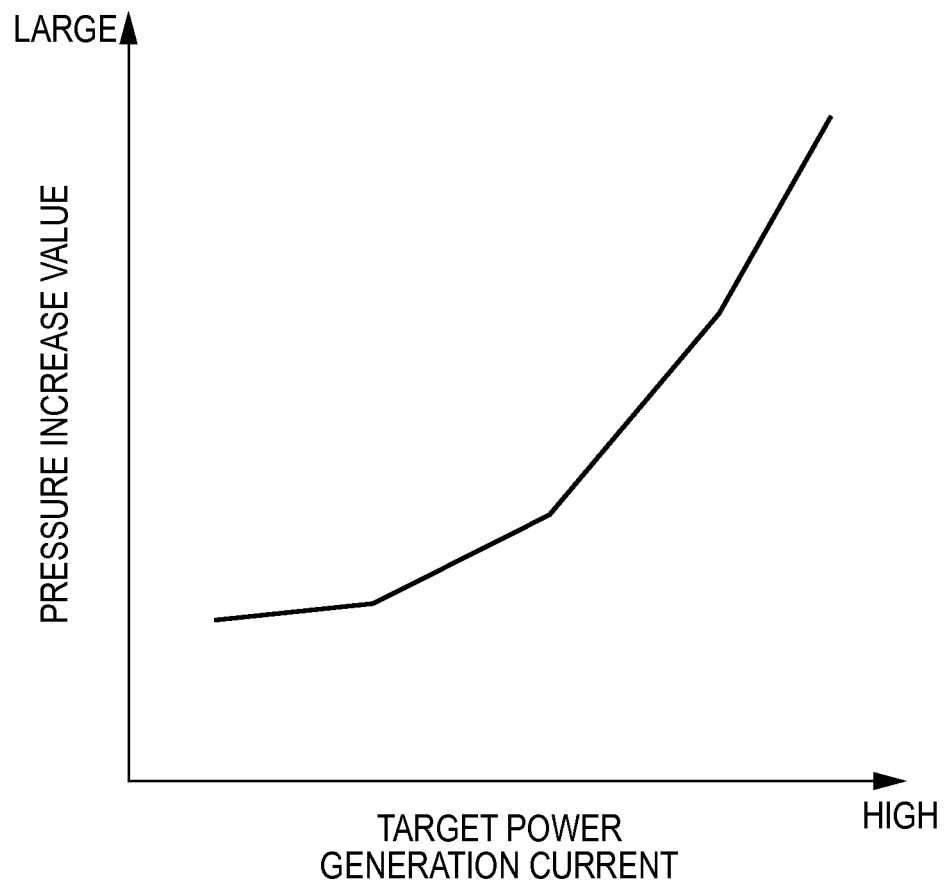
FIG. 7 is a table for calculating a pressure increase value based on the target output current.

In Step S43, the controller 4 refers to a table of FIG. 7 and calculates a pressure increase value necessary to prevent water clogging (flooding) in the anode gas flow passages 121 based on the target output current.

In Step S44, the controller 4 calculates a flooding preventing upper limit value by adding the pressure increase value calculated in Step S43 to the lower limit pressure calculated in the lower limit pressure calculation process. The flooding preventing upper limit value is an upper limit value of the anode pressure set in terms of ensuring output performance of the fuel cell stack.

In Step S45, the controller 4 sets the smallest one of the allowable maximum upper limit value, the membrane degradation preventing upper limit value and the flooding preventing upper limit value as the upper limit pressure of the anode pressure.

It should be noted that the allowable maximum upper limit value is set as the upper limit pressure of the anode pressure if the remaining two are smaller than the membrane degradation preventing upper limit value and the allowable maximum upper limit value and the flooding preventing upper limit value are equal. Similarly, the membrane degradation preventing upper limit value is set as the upper limit pressure of the anode pressure if the remaining two are smaller than the allowable maximum upper limit value and the membrane degradation preventing upper limit value and the flooding preventing upper limit value are equal. Any upper limit value may be set as the upper limit pressure of the anode pressure if the remaining two are smaller than the flooding preventing upper limit value and the allowable maximum upper limit value and the membrane degradation preventing upper limit value are equal.

Figure 8:
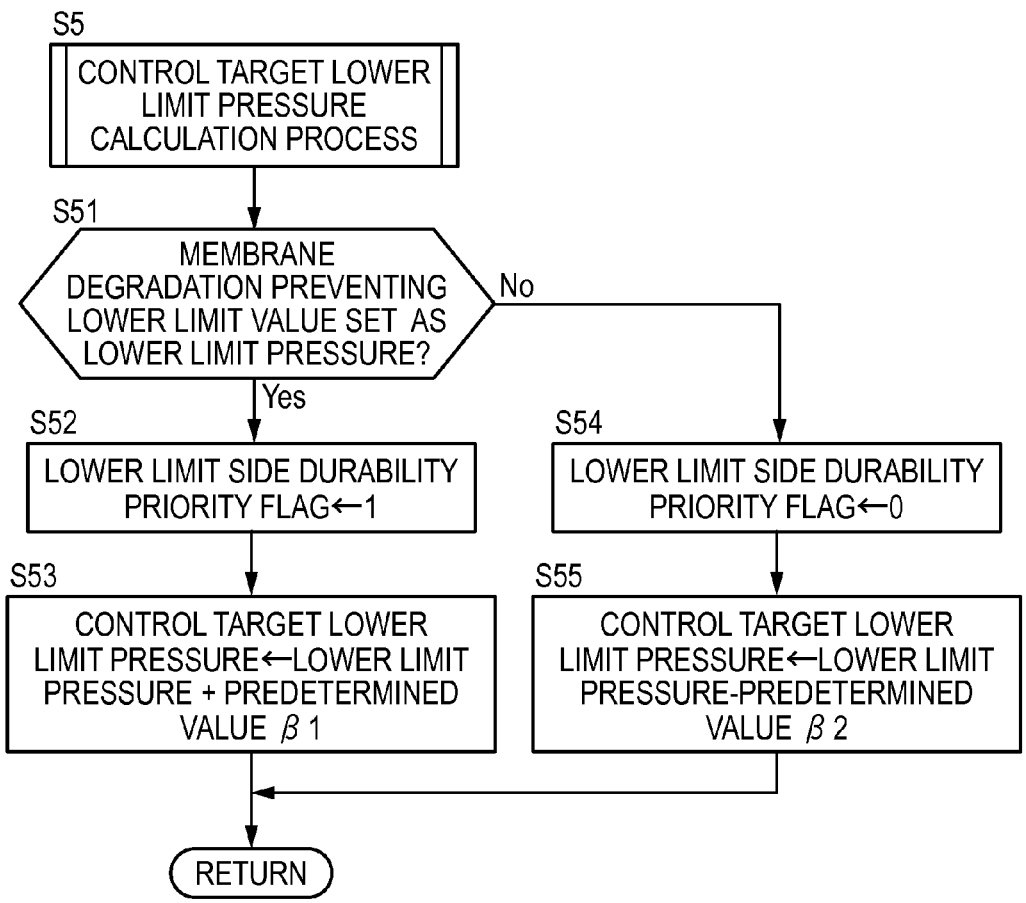
FIG. 8 is a flow chart showing a control target lower limit pressure calculation process.

FIG. 8 is a flow chart showing the control target lower limit pressure calculation process.

In Step S51, the controller 4 determines whether or not the membrane degradation preventing lower limit value is set as the lower limit pressure. The controller 4 performs a processing of Step S52 if the membrane degradation preventing lower limit value is set as the lower limit pressure. On the other hand, a processing of Step S54 is performed if the power generation requiring lower limit value is set as the lower limit pressure.

In Step S52, the controller 4 sets a lower limit side durability priority flag to 1. The lower limit side durability priority flag is a flag which is set to 1 when the membrane degradation preventing lower limit value is set as the lower limit pressure, and an initial value thereof is set at 0.

If the lower limit side durability priority flag is set at 1, it means, in other words, that the lower limit pressure is set based on a requirement to ensure durability of the electrolyte membranes 111 and, consequently, that of the fuel cell stack 2. Accordingly, it is not desirable that the anode pressure falls below the lower limit pressure. Thus, in the present embodiment, a value obtained by adding a predetermined value β1 to the lower limit pressure is set as the control target lower limit pressure to suppress the fall of the anode pressure below the lower limit pressure when the lower limit side durability priority flag is set at 1.

In Step S53, the controller 4 sets the value obtained by adding the predetermined value β1 to the lower limit pressure as the control target lower limit pressure.

In Step S54, the controller 4 sets the lower limit side durability priority flag to 0.

If the lower limit side durability priority flag is set at 0, it means that the power generation requiring lower limit value is set as the lower limit pressure, in other words, that the lower limit pressure is set based on a requirement to ensure output performance of the fuel cell stack 2. A function of discharging the liquid water in the anode gas flow passages 121 to the outside of the flow passages (drainage performance) increases as a differential pressure between the upper limit pressure and the lower limit pressure (pulsation width) increases. If drainage performance of the fuel cell stack 2 decreases, flooding is more likely to occur and output performance of the fuel cell stack 2 decreases.

Accordingly, when the power generation requiring lower limit value is set as the lower limit pressure, it is desirable to reliably reduce the anode pressure to the lower limit pressure and discharge the liquid water in the anode gas flow passages 121 to the outside of the flow passages when the anode pressure is increased next time. Thus, in the present embodiment, a value obtained by subtracting a predetermined value β2 from the lower limit pressure is set as the control target lower limit pressure to reliably reduce the anode pressure to the lower limit pressure when the lower limit side durability priority flag is set at 0.

In Step S55, the controller 4 sets the value obtained by subtracting the predetermined value β2 from the lower limit pressure as the control target lower limit pressure.

Figure 9:
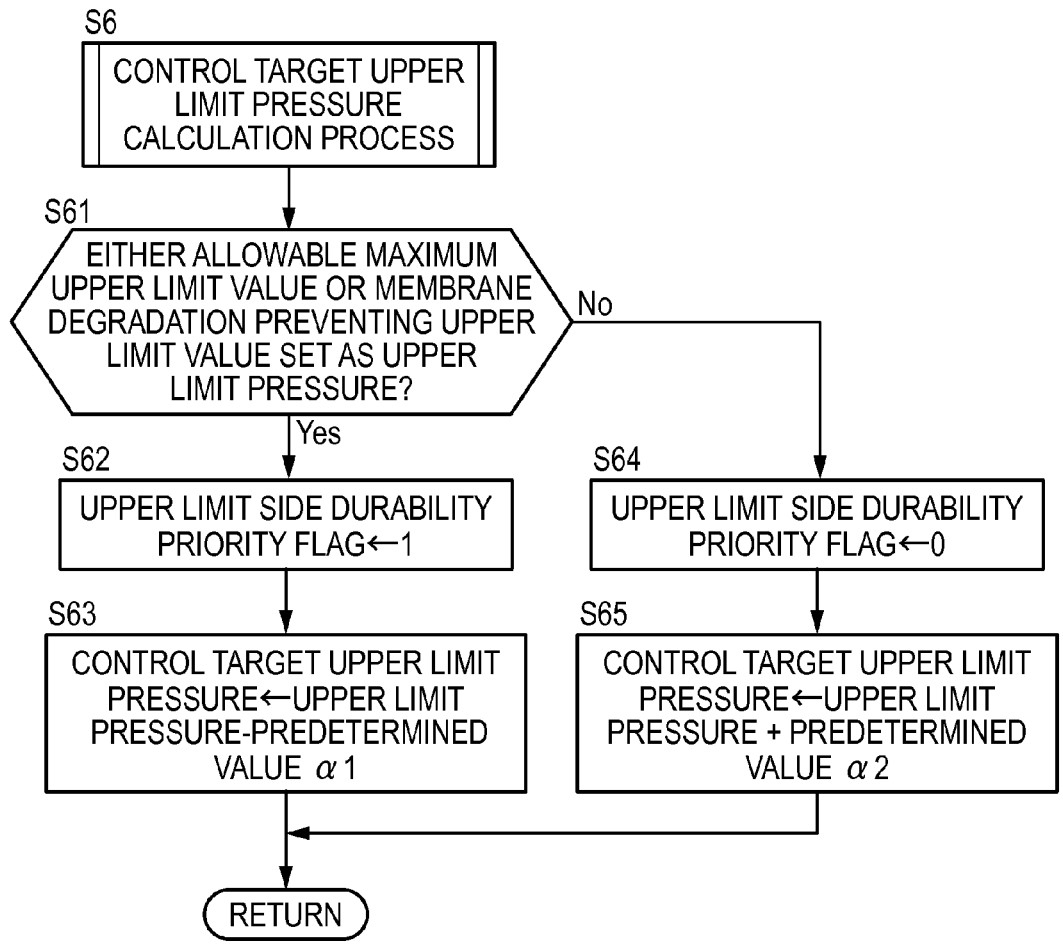
FIG. 9 is a flow chart showing a control target upper limit pressure calculation process.

FIG. 9 is a flow chart showing the control target upper limit pressure calculation process.

In Step S61, the controller 4 determines whether or not either one of the allowable maximum upper limit value and the membrane degradation preventing upper limit value is set as the upper limit pressure. The controller 4 performs a processing of Step S62 if either one of the allowable maximum upper limit value and the membrane degradation preventing upper limit value is set as the upper limit pressure. On the other hand, a processing of Step S64 is performed if the flooding preventing lower limit value is set as the upper limit pressure.

In Step S62, the controller 4 sets an upper limit side durability priority flag to 1. The upper limit side durability priority flag is a flag which is set to 1 when either one of the allowable maximum upper limit value and the membrane degradation preventing upper limit value is set as the upper limit pressure, and an initial value thereof is set at 0.

If the upper limit side durability priority flag is set at 1, it means, in other words, that the upper limit pressure is set based on the requirement to ensure durability of the electrolyte membranes 111 and, consequently, that of the fuel cell stack 2. Accordingly, it is not desirable that the anode pressure exceeds the upper limit pressure. Thus, in the present embodiment, a value obtained by subtracting a predetermined value $\alpha 1$ from the upper limit pressure is set as the control target upper limit pressure to suppress the excess of the anode pressure above the upper limit pressure when the upper limit side durability priority flag is set at 1.

In Step S63, the controller 4 sets the value obtained by subtracting the predetermined value $\alpha 1$ from the upper limit pressure as the control target upper limit pressure. In the present embodiment, the predetermined value $\alpha 1$ is set larger than the predetermined value $\beta 1$. The reason for that is described later with reference to FIG. 14.

In Step S64, the controller 4 sets the upper limit side durability priority flag to 0.

If the upper limit side durability priority flag is set at 0, it means that the flooding preventing upper limit value is set as the upper limit pressure, in other words, that the upper limit pressure is set based on a requirement to prevent flooding and ensure output performance (drainage performance) of the fuel cell stack 2. Accordingly, in such a case, it is problematic if the anode pressure does not increase to the upper limit pressure. Thus, it is desirable to reliably increase the anode pressure to the upper limit pressure. Thus, in the present embodiment, a value obtained by adding a predetermined value $\alpha 2$ to the upper limit pressure is set as the control target upper limit pressure to reliably increase the anode pressure to the upper limit pressure when the durability flag is set at 0.

In Step S65, the controller 4 sets the value obtained by adding the predetermined value $\alpha 2$ to the upper limit pressure as the control target upper limit pressure. In the present embodiment, the predetermined value $\alpha 2$ is set smaller than the predetermined value $\beta 2$. The reason for that is described later with reference to FIG. 15.

Figure 10:
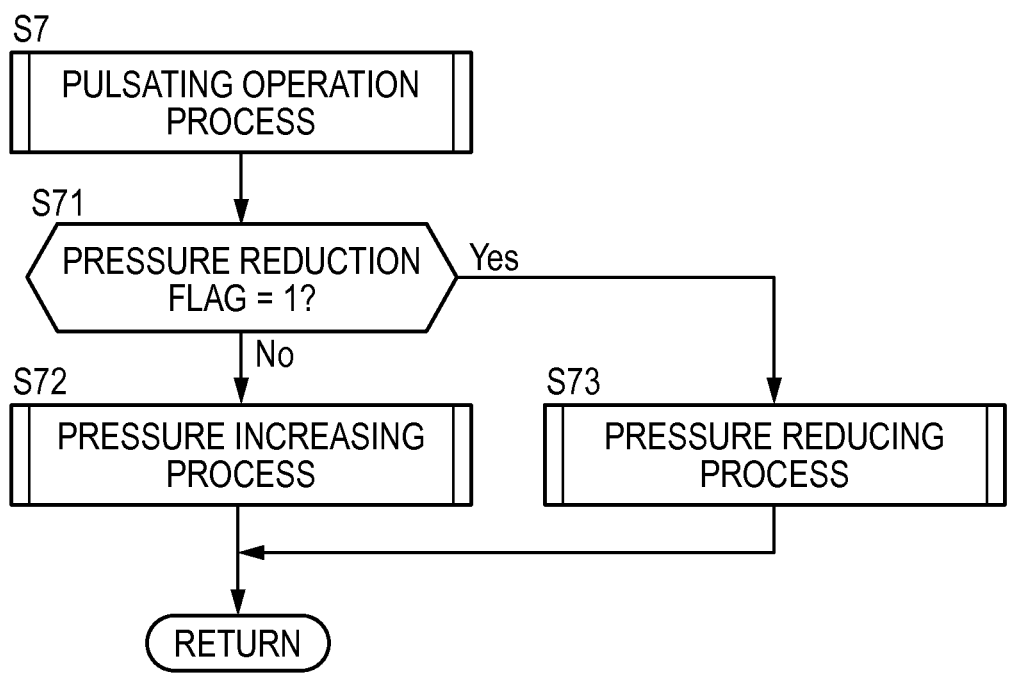
FIG. 10 is a flow chart showing a pulsating operation process.

FIG. 10 is a flow chart showing the pulsating operation process.

In Step S71, the controller 4 determines whether or not a pressure reduction flag is set at 1. The pressure reduction flag is a flag which is set to 1 during a pressure reducing process for anode pressure, and an initial value thereof is set at 0.

In Step S72, the controller 4 performs a pressure increasing process for anode pressure. The pressure increasing process is described in detail later with reference to FIG. 11.

In Step S73, the controller 4 performs the pressure reducing process for anode pressure. The pressure reducing process is described in detail later with reference to FIG. 13.

Figure 11:
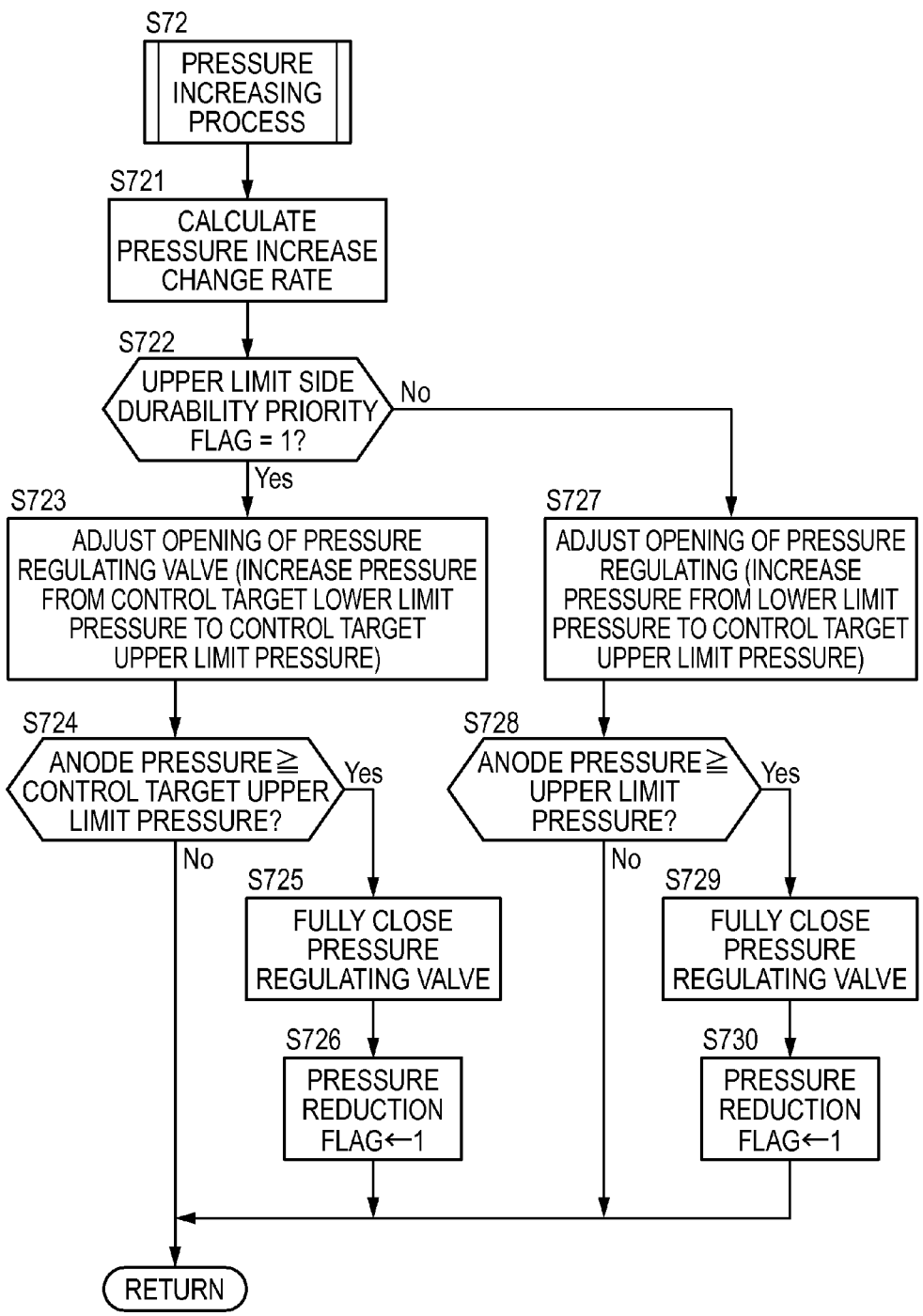
FIG. 11 is a flow chart showing a pressure increasing process for anode pressure.

FIG. 11 is a flow chart showing the pressure increasing process for anode pressure.

Figure 12:
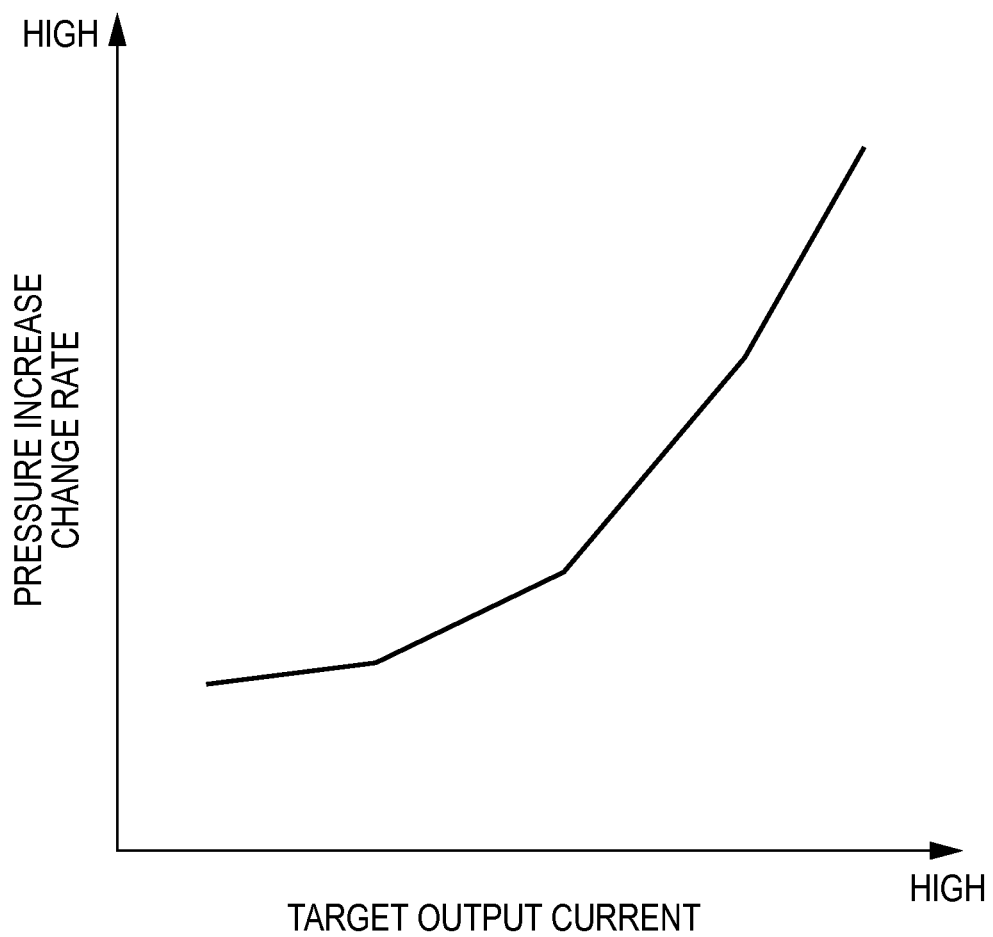
FIG. 12 is a table for calculating a pressure increase change rate based on the target output current.

In Step S721, the controller 4 calculates a pressure increase change rate (gradient of a target anode pressure) at the time of increasing the anode pressure based on the target output current by referring to a table of FIG. 12. The higher the pressure increase change rate, the faster an increasing rate of the anode pressure.

As shown in the table of FIG. 12, the pressure increase change rate is set to be higher with an increase in the target output current because the amount of moisture permeating from the cathode side to the anode side increases with an increase in the target output current.

In Step S722, the controller 4 determines whether or not the upper limit side durability priority flag is set at 1. The controller 4 performs a processing of Step S723 if the upper limit side durability priority flag is set at 1. On the other hand, a processing of Step S727 is performed if the upper limit side durability priority flag is set at 0.

In Step S723, the controller 4 sets the target anode pressure to increase the anode pressure at a desired pressure increase change rate from the control target lower limit pressure toward the control target upper limit pressure and adjusts the opening of the pressure regulating valve so that the anode pressure follows the target anode pressure.

In Step S724, the controller 4 determines whether or not the anode pressure has become equal to or higher than the control target upper limit pressure. The controller 4 finishes the process this time if the anode pressure is below the control target upper limit pressure. On the other hand, a processing of Step S725 is performed to finish the pressure increasing process if the anode pressure is not below the control target upper limit pressure.

As just described, when the upper limit side durability priority flag is set at 1, the excess of the anode pressure above the upper limit pressure can be suppressed by finishing the pressure increasing process when the anode pressure reaches the control target upper limit pressure lower than the upper limit pressure.

In Step S725, the controller 4 finishes the pressure increasing process by reducing the target anode pressure to the control target lower limit pressure. By reducing the target anode pressure to the control target lower limit pressure, the controller 4 basically controls the pressure regulating valve to be fully closed.

In Step S726, the controller 4 sets the pressure reduction flag to 1. The initial value of the pressure reduction flag is set at 0.

In Step S727, the controller 4 sets the target anode pressure to increase the anode pressure at a desired pressure increase change rate from the lower limit pressure toward the control target upper limit pressure and adjusts the opening of the pressure regulating valve so that the anode pressure follows the target anode pressure.

In Step S728, the controller 4 determines whether or not the anode pressure has become equal to or higher than the upper limit pressure. The controller 4 finishes the process this time if the anode pressure is below the upper limit pressure. On the other hand, a processing of Step S729 is performed to finish the pressure increasing process if the anode pressure is not below the upper limit pressure.

As just described, when the upper limit side durability priority flag is set at 0, the anode pressure can be reliably increased to the upper limit pressure by setting the control target upper limit pressure at a value higher than the upper limit pressure. Further, by finishing the pressure increasing process when the anode pressure reaches the upper limit pressure, the anode gas is not uselessly supplied to increase the anode pressure. Thus, it is possible to suppress deterioration of fuel economy while ensuring output performance (drainage performance) of the fuel cell stack 2.

In Step S729, the controller 4 finishes the pressure increasing process by reducing the target anode pressure to the control target lower limit pressure. By reducing the target anode pressure to the control target lower limit pressure, the controller 4 basically controls the pressure regulating valve to be fully closed.

In Step S730, the controller 4 sets the pressure reduction flag to 1.

Figure 13:
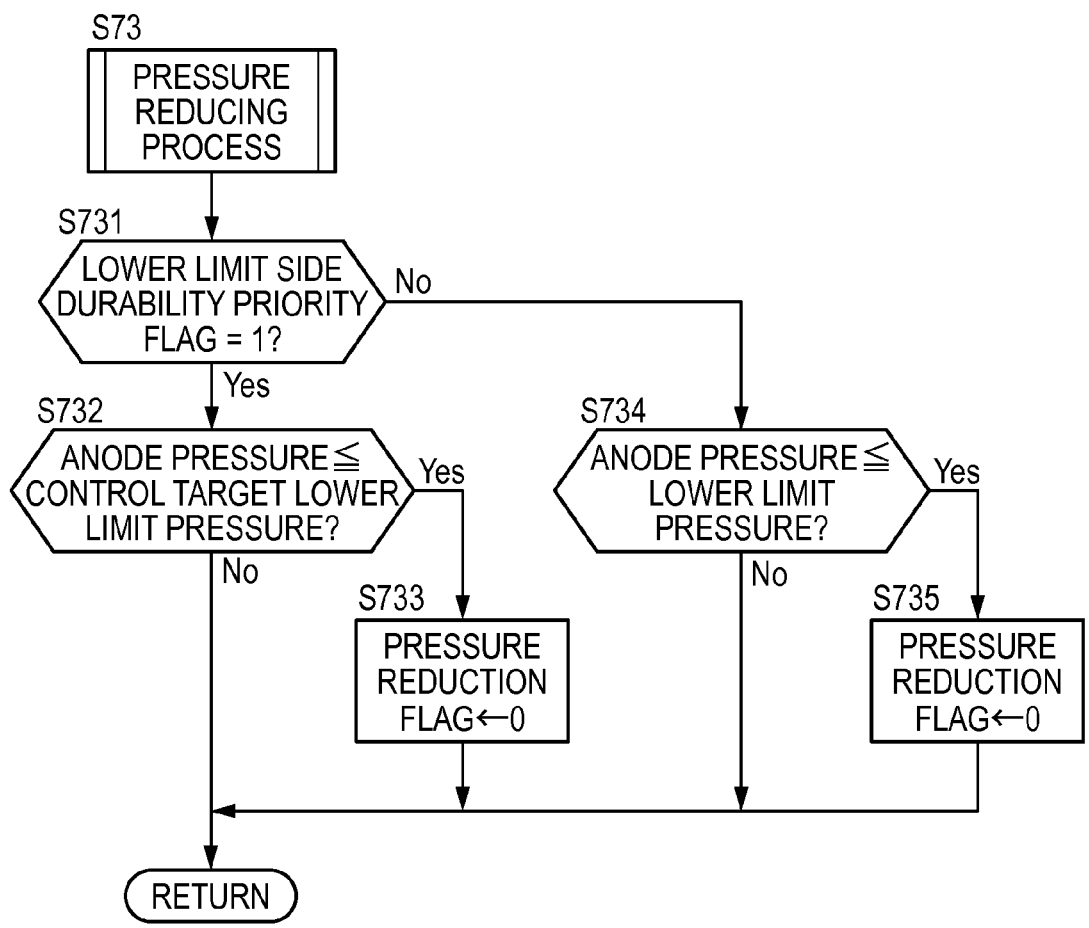
FIG. 13 is a flow chart showing a pressure reducing process for anode pressure.

FIG. 13 is a flow chart showing the pressure reducing process for anode pressure.

In Step S731, the controller 4 determines whether or not the lower limit side durability priority flag is set at 1. The controller 4 performs a processing of Step S732 if the lower limit side durability priority flag is set at 1 while performing a processing of Step S734 if the lower limit side durability priority flag is set at 0.

In Step S732, the controller 4 determines whether or not the anode pressure has become equal to or lower than the control target lower limit pressure. The controller 4 finishes the process this time if the anode pressure is above the control target lower limit pressure. On the other hand, a processing of Step S733 is performed to finish the pressure reducing process if the anode pressure is not above the control target lower limit pressure.

In Step S733, the controller 4 sets the pressure reduction flag to 0.

As just described, when the lower limit side durability priority flag is set at 1, the fall of the anode pressure below the lower limit pressure can be suppressed by finishing the pressure reducing process when the anode pressure reaches the control target lower limit pressure higher than the lower limit pressure.

In Step S734, the controller 4 determines whether or not the anode pressure has become equal to or lower than the lower limit pressure. The controller 4 finishes the process this time if the anode pressure is above the lower limit pressure. On the other hand, a processing of Step S735 is performed to finish the pressure reducing process if the anode pressure is not above the lower limit pressure.

As just described, when the lower limit side durability priority flag is set at 0, it can be suppressed that the anode pressure is not reduced to the lower limit pressure by setting the control target lower limit pressure at a value lower than the lower limit pressure.

In Step S735, the controller 4 sets the pressure reduction flag to 0.

Next, functions and effects of the pulsating operation control according to the present embodiment are described with reference to FIGS. 14 and 15.

Figure 14:
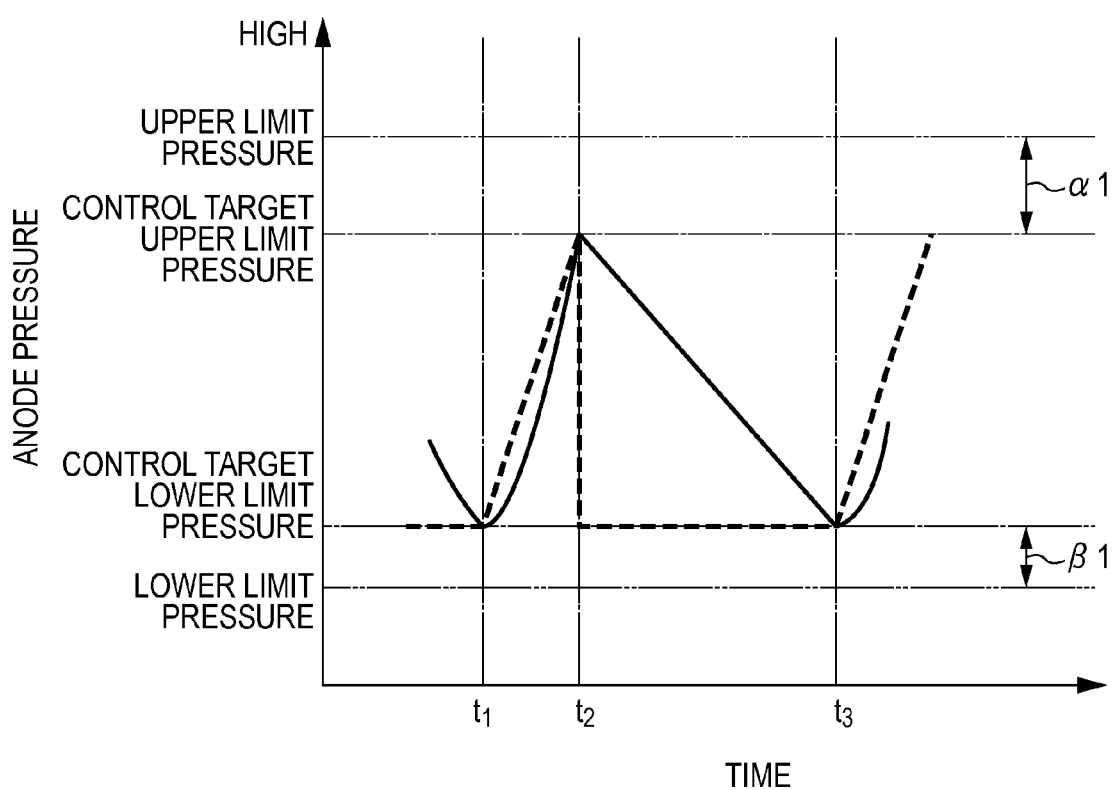
FIG. 14 is a time chart showing the operation of the pulsating operation control according to the first embodiment of the present invention.

FIG. 14 is a time chart showing the operation of the pulsating operation control according to the present embodiment. FIG. 14 is a time chart when the membrane degradation preventing upper limit value is set as the upper limit pressure and the membrane degradation preventing lower limit value is set as the lower limit pressure, i.e. when each of the upper limit side durability priority flag and the lower limit side durability priority flag is set at 1. In FIG. 14, broken line presents the target anode pressure and solid line represents the anode pressure.

As shown in FIG. 14, the value lower than the upper limit pressure by the predetermined value $\alpha 1$ is set as the control target upper limit pressure since the membrane degradation preventing upper limit value is set as the upper limit pressure.

Then, as shown from time t1 to time t2, the target anode pressure (broken line) is set to increase the anode pressure at the desired pressure increase change rate from the control target lower limit pressure toward the control target upper limit pressure and the opening of the pressure regulating value 33 is so adjusted that the anode pressure (solid line) follows the target anode pressure.

As just described, when the upper limit pressure is set based on the requirement to ensure durability of the fuel cell stack 2, the excess of the anode pressure above the upper limit pressure can be suppressed by setting the value lower than the upper limit pressure as the control target upper limit pressure. This can improve durability of the fuel cell stack 2.

When the anode pressure reaches the control target upper limit pressure at time t2, the controller 4 finishes the pressure increasing process and starts the pressure reducing process. The controller 4 stops the supply of the anode gas from the high-pressure tank 31 to the fuel cell stack 2 by fully closing the pressure regulating value 33 when starting the pressure reducing process.

This causes the anode pressure to be reduced by as much as the anode gas is consumed as shown from time t2 to time t3 since the anode gas remaining in the anode gas flow passages 121 in the fuel cell stack 2 is consumed with the passage of time by the aforementioned electrode reaction (1).

Further, if the anode gas remaining in the anode gas flow passages 121 is consumed, the pressure in the buffer tank 36 temporarily becomes higher than the pressure in the anode gas flow passages 121. Thus, the anode gas flows back from the buffer tank 36 to the anode gas flow passages 121. As a result, the anode gas remaining in the anode gas flow passages 121 and the anode gas in the anode off-gas having flowed back to the anode gas flow passages 121 are consumed with the passage of time and the anode pressure is further reduced.

When the anode pressure reaches the control target lower limit pressure at time t3, the controller 4 finishes the pressure reducing process and starts the pressure increasing process again.

As just described, when the lower limit pressure is set based on the requirement to ensure durability of the fuel cell stack 2, the fall of the anode pressure below the lower limit pressure can be suppressed by setting the value higher than the lower limit pressure as the control target lower limit pressure. This can improve durability of the fuel cell stack 2.

Further, in the present embodiment, the predetermined value al is set larger than the predetermined value $\beta 1$. This can provide the following effects.

In the case of performing the pulsating operation as in the present embodiment, the anode pressure increasing rate is faster than the anode pressure reducing rate. This is because the anode pressure can be increased with good responsiveness by adjusting the opening of the pressure regulating value 33 since it is sufficient to open the pressure regulating value 33 and supply the high-pressure anode gas from the high-pressure tank to increase the anode pressure, but it is the only way to wait for the consumption of the anode gas in the fuel cell stack 2 in order to reduce the anode gas.

Accordingly, if the predetermined value al is small, the anode pressure may reach the upper limit pressure beyond the control target upper limit pressure as it is increased with good responsiveness. Thus, in the present embodiment, the predetermined value al is set larger than the predetermined value $\beta 1$ when the upper limit side durability priority flag is set at 1.

Since the excess of the anode pressure above the upper limit pressure can be reliably suppressed in this way, a reduction in durability of the fuel cell stack 2 can be further suppressed.

Figure 15:
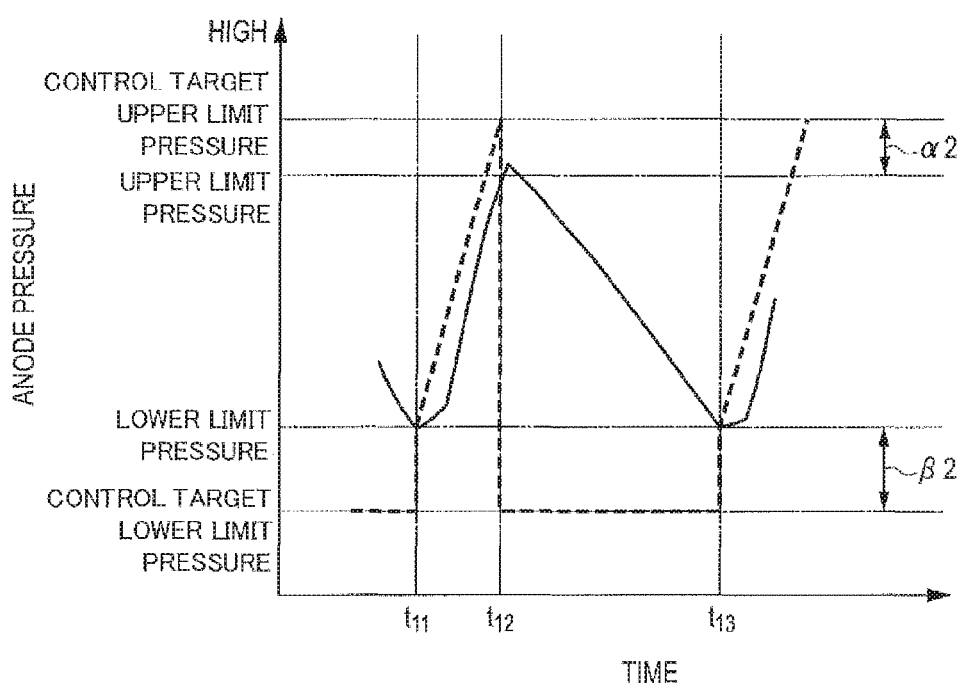
FIG. 15 is a time chart showing the operation of the pulsating operation control according to the first embodiment of the present invention.

FIG. 15 is a time chart showing the operation of the pulsating operation control according to the present embodiment. FIG. 15 is a time chart when the flooding preventing upper limit value is set as the upper limit pressure and the power generation requiring lower limit value is set as the lower limit pressure, i.e. when each of the upper limit side durability priority flag and the lower limit side durability priority flag is set at 0. In FIG. 15, broken line presents the target anode pressure and solid line represents the anode pressure.

As shown in FIG. 15, the value higher than the upper limit pressure by the predetermined value $\alpha 2$ is set as the control target upper limit pressure since the flooding preventing upper limit value is set as the upper limit pressure.

Then, as shown from time t11 to time t12, the target anode pressure (broken line) is set to increase the anode pressure at the desired pressure increase change rate from the lower limit pressure toward the control target upper limit pressure and the opening of the pressure regulating value 33 is so adjusted that the anode pressure (solid line) follows the target anode pressure.

As just described, when the upper limit pressure is set based on the requirement to prevent flooding and ensure output performance (drainage performance) of the fuel cell stack 2, the anode pressure can be reliably increased to the upper limit pressure by setting the control target upper limit pressure at the value higher than the upper limit pressure. That is, even in a situation where a steady deviation is produced in the control and the anode pressure cannot be increased to the control target upper limit pressure, the anode pressure can be reliably increased to the upper limit pressure since the control target upper limit pressure is set at the value higher than the upper limit pressure. This can ensure output performance (drainage performance) of the fuel cell stack 2.

Further, although the control target upper limit pressure is set at the value higher than the upper limit pressure, the anode gas is not uselessly supplied to increase the anode pressure since the pressure increasing process is finished when the anode pressure reaches the upper limit pressure. Thus, deterioration of fuel economy can be suppressed.

When the anode pressure reaches the upper limit pressure at time t12, the controller 4 finishes the pressure increasing process and starts the pressure reducing process. The controller 4 stops the supply of the anode gas from the high-pressure tank to the fuel cell stack 2 by fully closing the pressure regulating value 33 when starting the pressure reducing process.

When the anode pressure reaches the lower limit pressure at time t13, the controller 4 finishes the pressure reducing process and starts the pressure increasing process again.

At this time, the value lower than the lower limit pressure by the predetermined value β2 is set as the control target lower limit pressure since the power generation requiring lower limit value is set as the lower limit pressure. This enables the anode pressure to be reliably reduced to the lower limit pressure. As a result, the pulsation width (differential pressure between the upper limit pressure and the lower limit pressure) when the anode pressure is increased next time can be ensured, wherefore the liquid water in the anode gas flow passages 121 can be discharged to the outside of the flow passages. Thus, output performance (drainage performance) of the fuel cell stack 2 can be improved.

Further, in the present embodiment, the predetermined value α2 is set smaller than the predetermined value β2. This can provide the following effects.

As described above, in the case of performing the pulsating operation as in the present embodiment, the anode pressure increasing rate is faster than the anode pressure reducing rate.

Accordingly, if the predetermined value α2 is large when the upper limit side durability priority flag is set at 0, the anode pressure may excessively exceed the upper limit pressure as it is increased with good responsiveness. Thus, in the present embodiment, the predetermined value α2 is set smaller than the predetermined value β2 when the upper limit side durability priority flag is set at 0.

Since the excess of the anode pressure above the upper limit pressure can be suppressed in this way, the anode gas is not uselessly supplied to increase the anode pressure. Thus, deterioration of fuel economy can be suppressed.

Further, in the present embodiment, the target anode pressure is set to increase the anode pressure at the desired pressure increase change rate from the lower limit pressure toward the control target upper limit pressure instead of setting the target anode pressure to increase the anode pressure at the desired pressure increase change rate from the control target lower limit pressure toward the control target upper limit pressure when the pressure reducing process is finished and the pressure increasing process is started again. This can provide the following effects.

Figure 16:
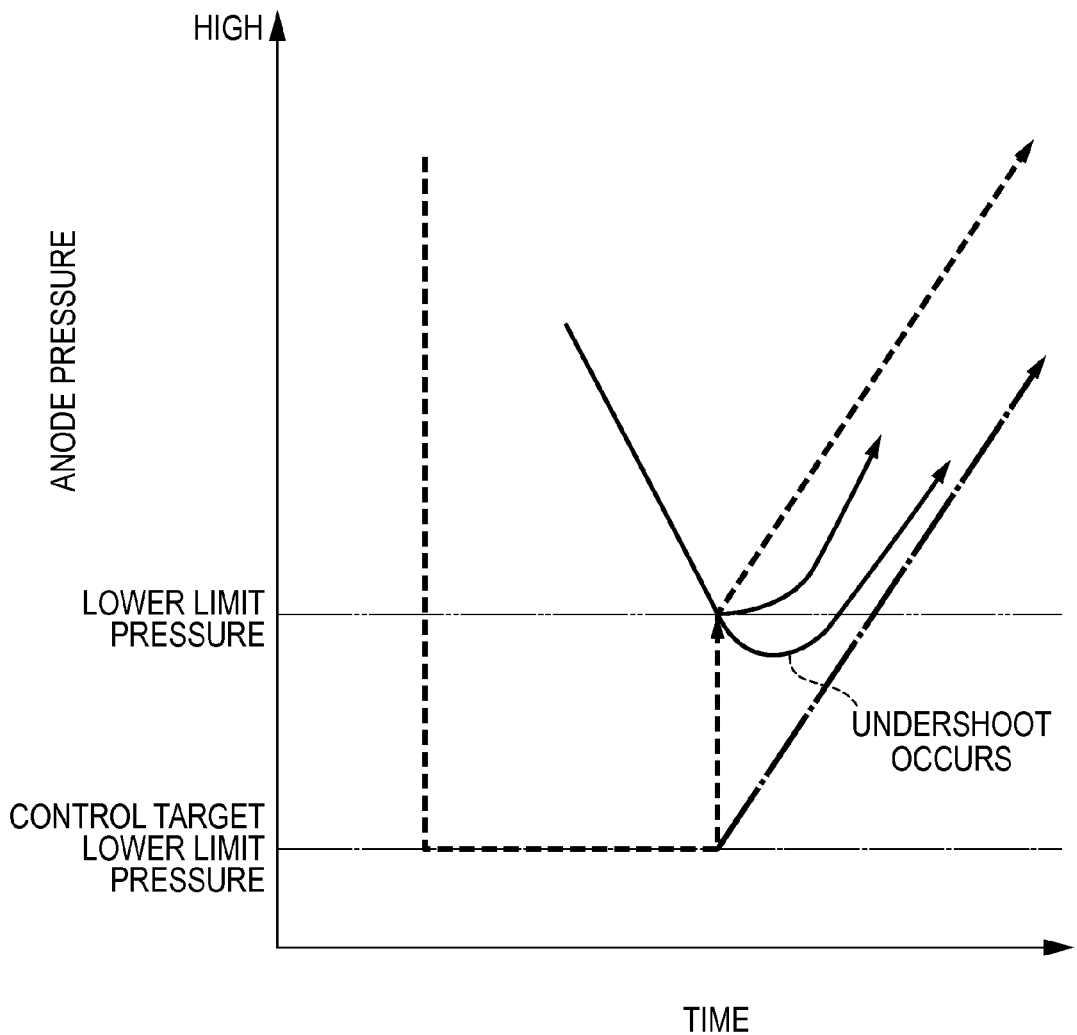
FIG. 16 is a chart showing effects brought about by setting a target anode pressure so that the anode pressure increases at a desired pressure increase change rate from the lower limit pressure toward the control target upper limit pressure.

FIG. 16 is a chart showing effects brought about by setting the target anode pressure to increase the anode pressure at the desired pressure increase change rate from the lower limit pressure toward the control target upper limit pressure.

If the target anode pressure is set to increase the anode pressure at the desired pressure increase change rate from the control target lower limit pressure toward the control target upper limit pressure as shown by dashed-dotted line in FIG. 16, the target anode pressure is lower than the lower limit pressure for a while even after the anode pressure falls to the lower limit pressure. Thus, the pressure regulating valve 33 is kept controlled to be fully closed so that the anode pressure follows the target anode pressure even after the anode pressure falls to the lower limit pressure. As a result, the anode pressure falls below the lower limit pressure and an undershoot occurs.

If such an undershoot occurs and the anode pressure falls below the lower limit pressure when the power generation requiring lower limit value is set as the lower limit pressure, the output current of the fuel cell stack 2 may become lower than the target output current.

Contrary to this, such an undershoot can be suppressed by setting the target anode pressure to increase the anode pressure at the desired pressure increase change rate from the lower limit pressure toward the control target upper limit pressure as in the present embodiment when a transition is made from the pressure reducing process to the pressure increasing process. Therefore, the fall of the output current of the fuel cell stack 2 below the target output current can be suppressed, with the result that output performance of the fuel cell stack 2 can be improved.

Second Embodiment

Next, a second embodiment of the present invention is described. The second embodiment of the present invention differs from the first embodiment in that the anode pressure is kept for a fixed time. This point of difference is described below. It should be noted that, in the following embodiment, components having functions similar to those of the first embodiment described above are denoted by the same reference signs and repeated description is omitted as appropriate.

In the present embodiment, a pressure (anode pressure) detected by the pressure sensor 34 provided in the anode gas supply passage 32 is used as a pressure of the entire anode system including each anode gas flow passage 121 in the fuel cell stack 2 and the buffer tank 36.

Accordingly, there is a possibility of a time delay, although this time delay is short, until the pressure in each anode gas flow passage 121 in the fuel cell stack reaches the pressure detected by the pressure sensor 34. Thus, in the present embodiment, the anode pressure is kept at the upper limit pressure and the lower limit pressure for a while after reaching the upper limit pressure and the lower limit pressure.

Figure 17:
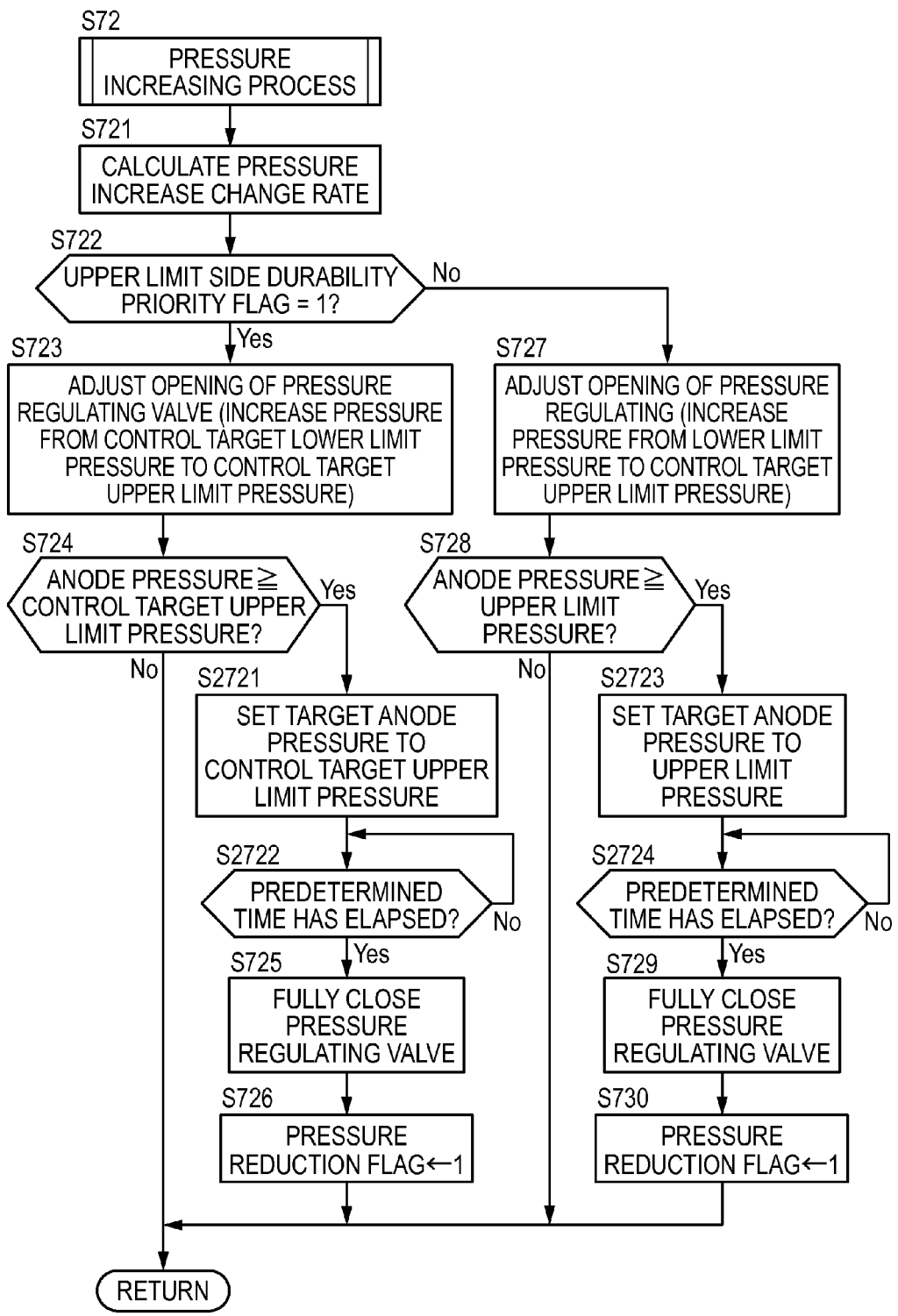
FIG. 17 is a flow chart showing a pressure increasing process according to a second embodiment of the present invention.

FIG. 17 is a flow chart showing a pressure increasing process according to the present embodiment.

In Step S2721, the controller 4 sets the target anode pressure to the control target upper limit pressure.

In Step S2722, the controller 4 determines whether or not a predetermined time has elapsed after the target anode pressure was set to the control target upper limit pressure. The controller 4 performs a processing of Step S725 if the predetermined time has elapsed after the target anode pressure was set to the control target upper limit pressure while returning to the processing of S2722 unless the predetermined time has elapsed.

In Step S2723, the controller 4 sets the target anode pressure to the upper limit pressure.

In Step S2724, the controller 4 determines whether or not a predetermined time has elapsed after the target anode pressure was set to the upper limit pressure. The controller 4 performs a processing of Step S729 if the predetermined time has elapsed after the target anode pressure was set to the upper limit pressure while returning to the processing of S2724 unless the predetermined time has elapsed.

Figure 18:
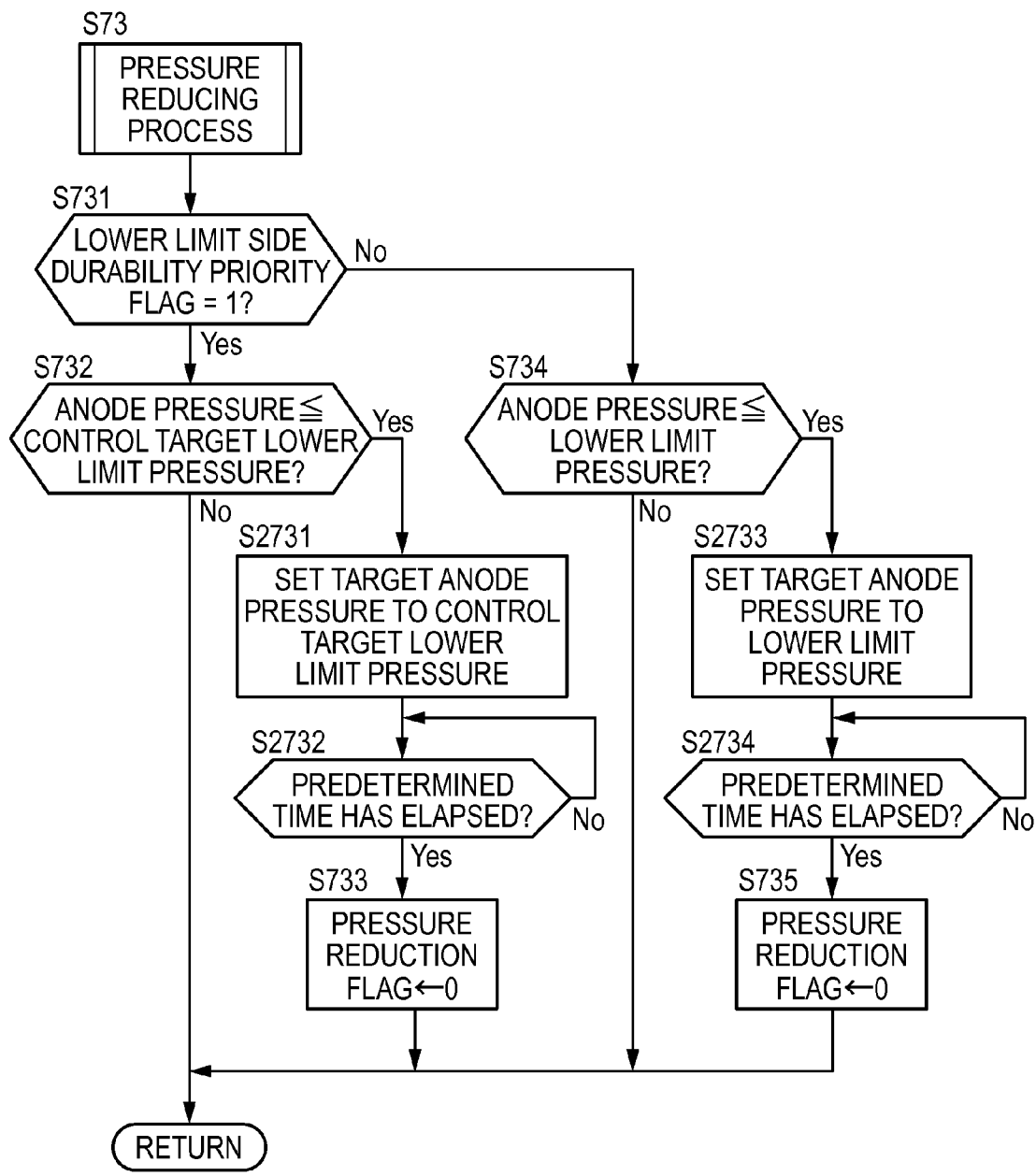
FIG. 18 is a flow chart showing a pressure reducing process according to the second embodiment of the present invention.

FIG. 18 is a flow chart showing a pressure reducing process according to the present embodiment.

In Step S2731, the controller 4 sets the target anode pressure to the control target lower limit pressure.

In Step S2732, the controller 4 determines whether or not a predetermined time has elapsed after the target anode pressure was set to the control target lower limit pressure. The controller 4 performs a processing of Step S733 if the predetermined time has elapsed after the target anode pressure was set to the control target lower limit pressure while returning to the processing of S2732 unless the predetermined time has elapsed.

In Step S2733, the controller 4 sets the target anode pressure to the lower limit pressure.

In Step S2734, the controller 4 determines whether or not a predetermined time has elapsed after the target anode pressure was set to the lower limit pressure. The controller 4 performs a processing of Step S735 if the predetermined time has elapsed after the target anode pressure was set to the lower limit pressure while returning to a processing of S2734 unless the predetermined time has elapsed.

According to the present embodiment described above, the target anode pressure is kept at the control target upper limit pressure for the predetermined time after the anode pressure reaches the control target upper limit pressure when the upper limit side durability priority flag is set at 1. This enables the pressure in the anode gas flow passages 121 to be reliably increased to the control target upper limit pressure.

Further, the target anode pressure is kept at the control target lower limit pressure for the predetermined time after the anode pressure reaches the control target lower limit pressure when the lower limit side durability priority flag is set at 1. This enables the pressure in the anode gas flow passages 121 to be reliably reduced to the control target lower limit pressure.

Effects when each of the upper limit side durability priority flag and the lower limit side durability priority flag is set at 0 are described with reference to FIG. 19.

Figure 19:
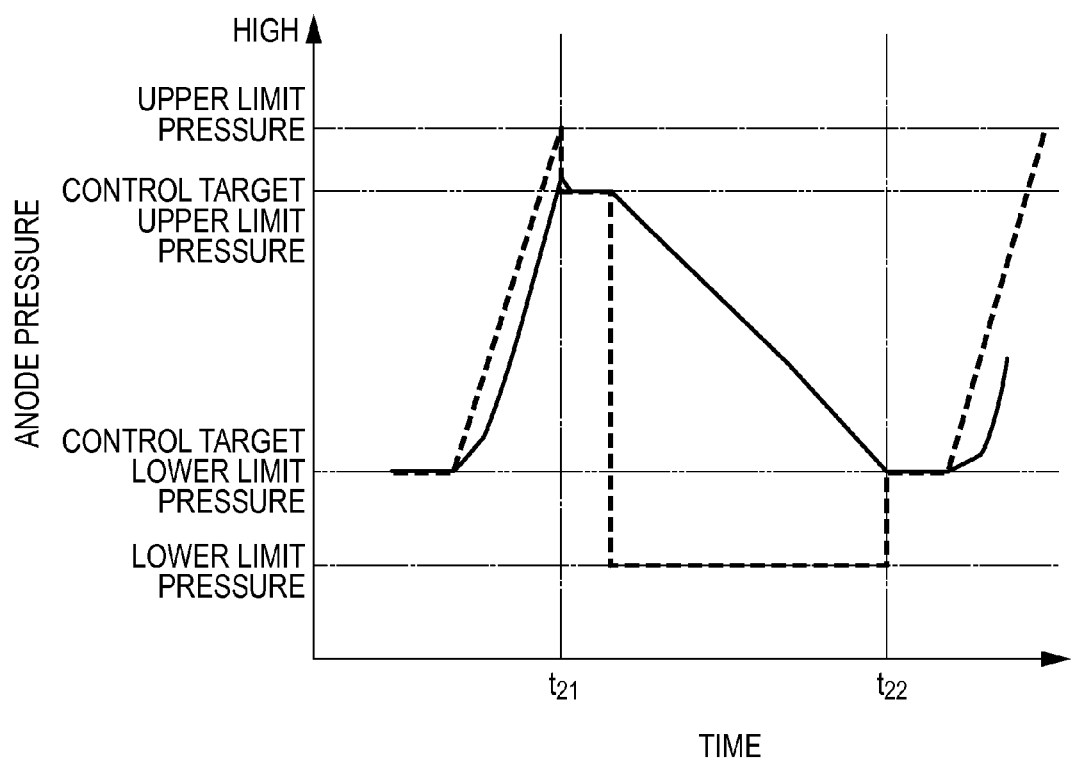
FIG. 19 is a time chart showing the operation of a pulsating operation control according to the second embodiment of the present invention.

FIG. 19 is a time chart showing the operation of a pulsating operation control according to the present embodiment. FIG. 19 is a time chart when the flooding preventing upper limit value is set as the upper limit pressure and the power generation requiring lower limit value is set as the lower limit pressure, i.e. when each of the upper limit side durability priority flag and the lower limit side durability priority flag is set at 0. In FIG. 19, broken line presents the target anode pressure and solid line represents the anode pressure.

As shown in FIG. 19, the target anode pressure is changed from the control target upper limit pressure to the upper limit pressure and kept at the upper limit pressure for a predetermined time after the anode pressure reaches the upper limit pressure at time t21 when the upper limit side durability priority flag is set at 0. This enables the pressure in the anode gas flow passages 121 to be reliably increased to the upper limit pressure.

As just described, the target anode pressure is kept at the upper limit pressure for the predetermined time after being changed from the control target upper limit pressure to the upper limit pressure instead of keeping the target anode pressure at the control target upper limit pressure for the predetermined time, thereby being able to suppress the excess of the anode pressure above the upper limit pressure while the target anode pressure is kept. Thus, the anode gas is not uselessly supplied to increase the anode pressure and deterioration of fuel economy can be suppressed.

Further, as shown in FIG. 19, the target anode pressure is changed from the control target lower limit pressure to the lower limit pressure and kept at the lower limit pressure for a predetermined time after the anode pressure reaches the lower limit pressure at time t22 when the lower limit side durability priority flag is set at 0. This enables the pressure in the anode gas flow passages 121 to be reliably reduced to the lower limit pressure.

As just described, when the lower limit side durability priority flag is set at 0, the target anode pressure is kept at the lower limit pressure for the predetermined time after being changed from the control target lower limit pressure to the lower limit pressure as when the lower limit side durability priority flag is set at 1 instead of keeping the target anode pressure at the control target lower limit pressure for the predetermined time. This can suppress the fall of the anode pressure below the lower limit pressure while the target anode pressure is kept. Thus, the fall of the output current of the fuel cell stack 2 below the target output current can be suppressed, with the result that output performance of the fuel cell stack 2 can be improved.

Although the embodiments of the present invention have been described above, the above embodiments are only an illustration of some application examples of the present invention and not intended to limit the technical scope of the present invention to the specific configurations of the above embodiments.

For example, in each of the above embodiments, the buffer tank 36 as a space for storing the anode off-gas is provided in the anode gas discharge passage 35. However, such a buffer tank 36 may not be provided and, for example, an internal manifold of the fuel cell stack 2 may be used as a space alternative to the buffer tank 36. It should be noted that the internal manifold mentioned here is a space in the fuel cell stack 2 where the anode off-gas having flowed through the anode gas flow passage 121 of each separator is collected and the anode off-gas is discharged to the anode gas discharge passage 35 via the manifold.

The invention claimed is:
1. A fuel cell system, comprising:
a control valve configured to control a pressure of anode gas to be supplied to a fuel cell;

a pressure detection unit configured to detect the pressure of the anode gas to be supplied to the fuel cell; and a controller in communication with the control value and the pressure detection unit, wherein the controller is programmed to:

periodically and repeatedly set a target upper limit pressure and a target lower limit pressure as a target pressure of the anode gas;

control the pressure of the anode gas by feedback-controlling the control valve based on the pressure of the anode gas detected by the pressure detection unit and the target pressure;

set the smaller one of an upper limit value of the pressure of the anode gas set based on durability performance of the fuel cell and an upper limit value of the pressure of the anode gas set based on output performance of the fuel cell as an upper limit pressure of the anode gas;

set a value smaller than the upper limit value as the target upper limit pressure when the upper limit value of the anode gas set based on the durability performance of the fuel cell is selected as the upper limit pressure of the anode gas; and set the upper limit value or a pressure higher than the upper limit value as the target upper limit pressure when the upper limit value of the anode gas set based on the output performance of the fuel cell is selected.

2. The fuel cell system according to claim 1, wherein:
the controller finishes a pressure increase of the anode gas when the pressure of the anode gas reaches the upper limit pressure if the upper limit value of the anode gas set based on the output performance of the fuel cell is selected as the upper limit pressure of the anode gas.

3. The fuel cell system according to claim 1, wherein the controller is further configured to set the larger one of a lower limit value of the pressure of the anode gas set based on the durability performance of the fuel cell and a lower limit value of the pressure of the anode gas set based on the output performance of the fuel cell as a lower limit pressure of the anode gas;

wherein the controller sets a value larger than the lower limit value as the target lower limit pressure when the lower limit value set based on the durability performance of the fuel cell is selected as the lower limit pressure of the anode gas and sets a value smaller than the lower limit value as the target lower limit pressure when the lower limit value set based on the output performance of the fuel cell is selected.

4. The fuel cell system according to claim 3, wherein:
the controller finishes a pressure reduction of the anode gas when the pressure of the anode gas reaches the lower limit pressure if the lower limit value set based on the output performance of the fuel cell is selected as the lower limit pressure of the anode gas.

5. The fuel cell system according to claim 3, wherein:
a difference between the target upper limit pressure and the upper limit value when the upper limit value set based on the output performance of the fuel cell is selected as the upper limit pressure of the anode gas is smaller than a difference between the lower limit value and the target lower limit pressure when the lower limit value set based on the output performance of the fuel cell is selected as the lower limit pressure of the anode gas.

6. The fuel cell system according to claim 3, wherein:
the controller increases the pressure of the anode gas at a pressure increase change rate calculated according to an operating state of the fuel cell.

7. The fuel cell system according to claim 6, wherein:
the controller increases the pressure of the anode gas at the pressure increase change rate from the lower limit pressure toward the target upper limit pressure when the pressure of the anode gas is increased if the upper limit value set based on the output performance of the fuel cell is selected as the upper limit pressure of the anode gas and the lower limit value set based on the output performance of the fuel cell is selected as the lower limit pressure of the anode gas.

8. The fuel cell system according to claim 1, wherein:
the controller finishes a pressure increase of the anode gas after the target pressure of the anode gas is kept at the upper limit pressure for a predetermined time when the pressure of the anode gas reaches the upper limit pressure if the upper limit value set based on the output performance of the fuel cell is selected as the upper limit pressure of the anode gas.

9. The fuel cell system according to claim 3, wherein:
the controller finishes a pressure reduction of the anode gas after the target pressure of the anode gas is kept at the target lower limit pressure for a predetermined time when the pressure of the anode gas reaches the lower limit pressure if the lower limit value set based on the output performance of the fuel cell is selected as the lower limit pressure of the anode gas.

10. The fuel cell system according to claim 1, wherein:
the upper limit value of the pressure of the anode gas set based on the durability performance of the fuel cell is a maximum value of a gas pressure suppliable to the fuel cell determined according to the specifications of the fuel cell.

11. The fuel cell system according to claim 1, wherein:
the upper limit value of the pressure of the anode gas set based on the durability performance of the fuel cell is a value set based on an allowable maximum value of a differential pressure between the pressure of the anode gas and a pressure of cathode gas to be supplied to the fuel cell.

12. The fuel cell system according to claim 1, wherein:
the upper limit value of the pressure of the anode gas set based on the output performance of the fuel cell is a value set based on a pressure increase value necessary to discharge moisture present in anode gas flow passages in the fuel cell to outside of the anode gas flow passages.

13. The fuel cell system according to claim 3, wherein:
the lower limit value of the pressure of the anode gas set based on the durability performance of the fuel cell is a value set based on an allowable maximum value of a differential pressure between the pressure of the anode gas and a pressure of cathode gas to be supplied to the fuel cell.

14. The fuel cell system according to claim 3, wherein:
the lower limit value of the pressure of the anode gas set based on the output performance of the fuel cell is a minimum value of the pressure of the anode gas capable of outputting a target output determined according to a load of the fuel cell.

* * * * *